US009961490B2

(12) United States Patent
Gnanasekaran

(10) Patent No.: US 9,961,490 B2
(45) Date of Patent: May 1, 2018

(54) APPLICATION PROVISIONING SYSTEM

(71) Applicant: PAYPAL, INC., San Jose, CA (US)

(72) Inventor: Venkatesh Gnanasekaran, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 270 days.

(21) Appl. No.: 14/473,198

(22) Filed: Aug. 29, 2014

(65) Prior Publication Data
US 2016/0066140 A1   Mar. 3, 2016

(51) Int. Cl.
| | |
|---|---|
| *H04W 36/00* | (2009.01) |
| *H04W 4/02* | (2018.01) |
| *G06Q 20/32* | (2012.01) |
| *G06Q 30/02* | (2012.01) |
| *G06Q 30/06* | (2012.01) |
| *H04M 1/725* | (2006.01) |
| *G06F 9/46* | (2006.01) |
| *G06F 17/30* | (2006.01) |
| *H04W 4/04* | (2009.01) |

(52) U.S. Cl.
CPC ............. *H04W 4/021* (2013.01); *G06F 9/46* (2013.01); *G06F 17/3087* (2013.01); *G06Q 20/3224* (2013.01); *G06Q 20/3227* (2013.01); *G06Q 30/0207* (2013.01); *G06Q 30/0601* (2013.01); *H04M 1/72572* (2013.01); *H04W 4/02* (2013.01); *H04W 4/043* (2013.01)

(58) Field of Classification Search
CPC ........... G06Q 20/3224; G06Q 20/0425; G06Q 20/20; G06Q 20/227; G06Q 20/3274; G06Q 20/363; G06Q 20/4012; G06Q 30/0207; G06F 17/30241; G06F 17/3053
USPC ............ 455/456.1, 456.3; 713/300; 715/863
See application file for complete search history.

(56) References Cited

U.S. PATENT DOCUMENTS

| | | | |
|---|---|---|---|
| 8,412,237 B1 | 4/2013 | Ohme | |
| 2010/0185736 A1* | 7/2010 | Jayaraman | .......... H04M 1/7253 709/206 |
| 2011/0283334 A1* | 11/2011 | Choi | ................... G06F 3/04883 725/148 |
| 2012/0173897 A1 | 7/2012 | Karkaria et al. | |
| 2013/0267224 A1 | 10/2013 | Krishnaswamy et al. | |
| 2013/0283215 A1 | 10/2013 | Sundaramurthy et al. | |
| 2014/0380382 A1* | 12/2014 | Gupta | ................ H04N 21/4826 725/61 |

* cited by examiner

*Primary Examiner* — Charles Shedrick
(74) *Attorney, Agent, or Firm* — Haynes & Boone, LLP

(57) ABSTRACT

Systems and methods for provisioning applications include storing an application identifier in association with location information in a database that is accessible by a user device. The user device then detects that it is located at a location included in the location information. In response to detecting that it is located at the location, the user device determines an application that is included on the user device and that is identified by the application identifier that is associated with the first location. The user device then automatically provides the application for display to a user. In some embodiments, the application may be automatically provided by automatically launching the application on the user device, and that application may be automatically closed if the user device leaves the location or the application is not used for a predetermined amount of time.

20 Claims, 17 Drawing Sheets

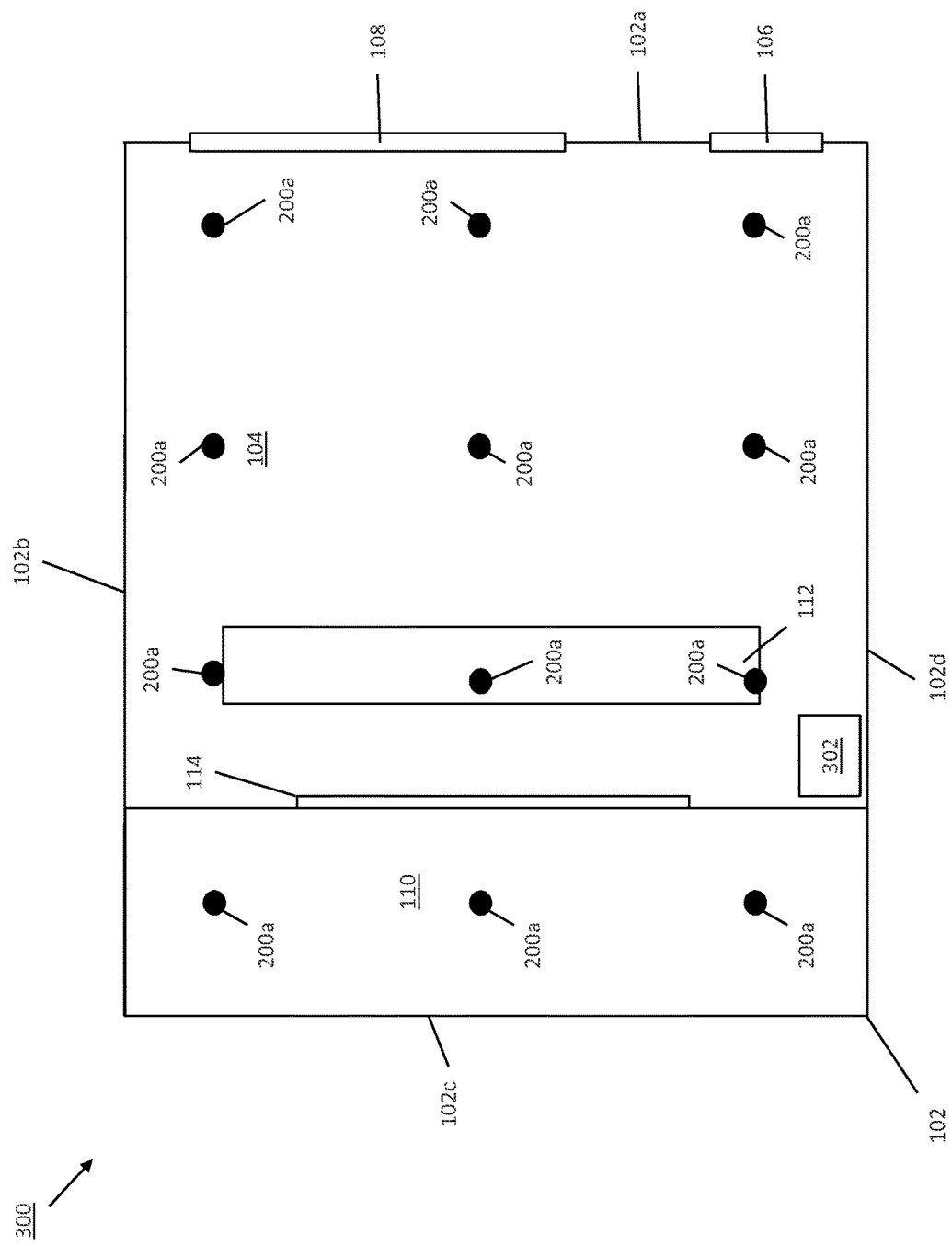

APPLICATION PROVISIONING SYSTEM

BACKGROUND

Field of the Disclosure

The present disclosure generally relates to online and/or mobile payments and more particularly to an application provisioning system that may be used in making online and/or mobile payments.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Online and/or mobile payments may be enabled on user devices via, for example, payment applications on those user devices. With the introduction of mobile software distribution platforms (also known as "app stores") for mobile user device such as, for example, the Amazon Appstore, the App Store from Apple, Inc, Google Play from Google, Inc., and the Windows Store from Microsoft, Inc., the installation and use of applications on user devices has grown rapidly. In fact, many users may have dozens, if not hundreds, of applications installed on their mobile user devices at any given time. Each of those applications is associated with an application icon that is displayed on one of a plurality of home screens of the user device and that may be selected in order to launch that application such that the user may use that application. However, finding a particular application icon amongst the plurality of application icons included on the home screens of the user device can be very difficult and time consuming, particularly when application icons may be located in folders with other application icons such that they are not immediately recognizable on the home screen. As such, a user must expend time and energy searching for application icons of the application that the user would like to use, which can in some cases lead the user to not using the application.

Thus, there is a need for an improved application provisioning system.

BRIEF DESCRIPTION OF THE FIGURES

FIG. 3a is a schematic top view illustrating an embodiment of an application provisioning system that includes a plurality of the beacon devices of FIG. 2 in the physical merchant location of FIG. 1;

Figure 1:
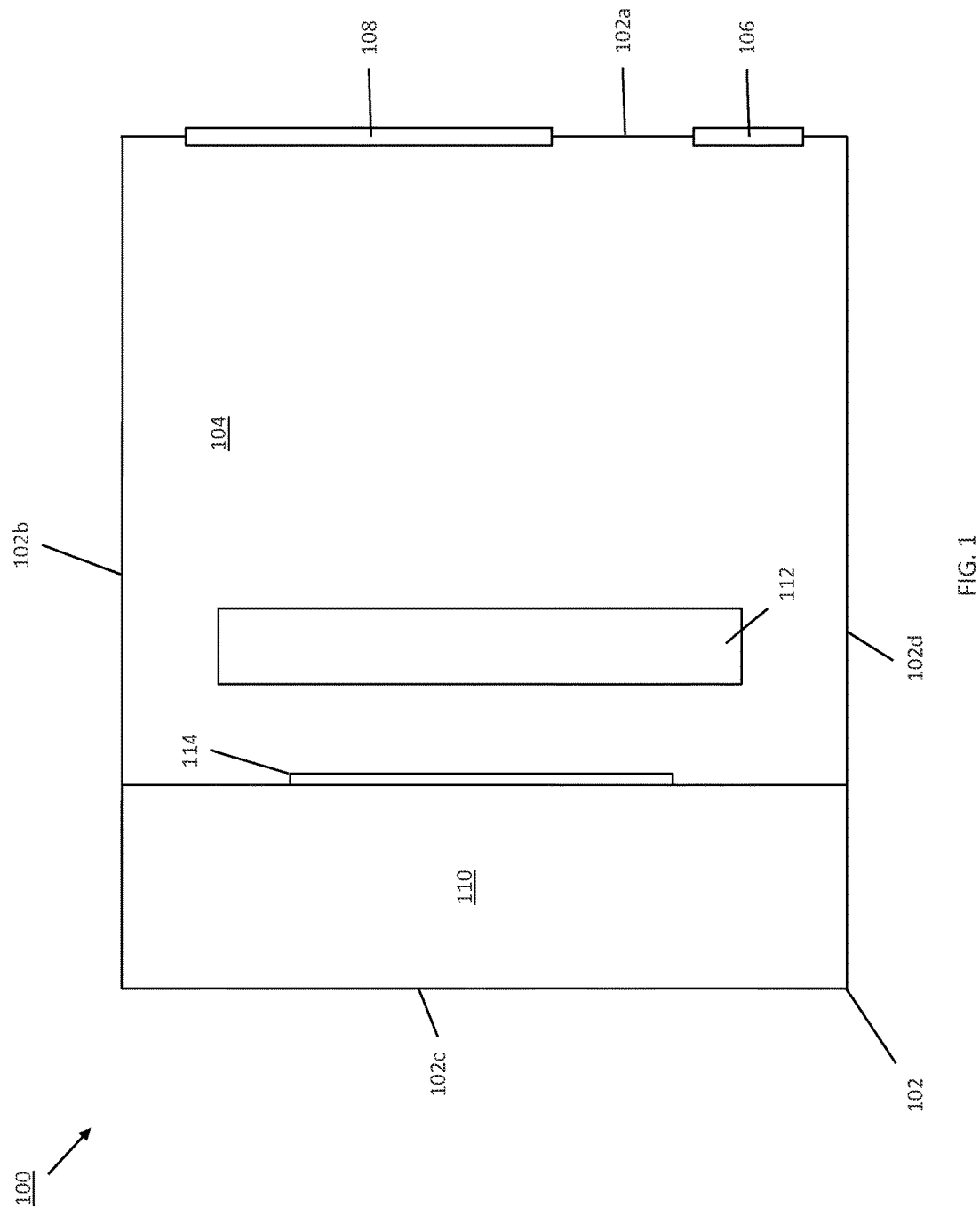
FIG. 1 is a schematic top view illustrating an embodiment of a physical merchant location.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for automatically provisioning applications to a user when the user is at a particular location. For example, the systems and methods may include determining application provisioning settings, either automatically or as provided by a user, such that when a user device of the user enters a merchant location, communicates with a merchant system, or otherwise determines that the user is in a location that is associated with a merchant and at which particular applications may be helpful to the user, those applications are automatically provided to the user so that the user may use any of those applications. In some examples, those applications may be launched so that they are ready for immediate use by the user, while in other examples, the application icons for those applications may be provided for display to the user such that those applications may be quickly and easily launched. As such, a user entering a merchant location such as a restaurant may be automatically provided with a payment application (or associated application icon) for making payments to the restaurant, an Internet browser application (or associated application icon) directed to a menu of the restaurant, and a social media application (or associated application icon) directed to a social media profile of the restaurant. The systems and methods may also monitor whether the user leaves the merchant location and/or if the automatically provided applications are not being used in order to determine whether to automatically close those applications such that they are not left open on the user device when the user does not need to use them.

Referring now to FIG. 1, an embodiment of a physical merchant location 100 is illustrated. The physical merchant location 100 illustrated in FIG. 1 is provided as just one example of a location that may be associated with application provisioning instructions, and as discussed below the application provision system of the present disclosure will be beneficial for a wide variety of other types of locations. The physical merchant location 100 includes a merchant building 102 having a plurality of exterior walls 102a, 102b, 102c, and 102d that define a physical merchant location interior 104. The exterior wall 102a includes an exterior door 106 (e.g., a "front" door in the illustrated embodiment) and an exterior window 108. In the illustrated embodiment, the physical merchant location interior 104 includes a merchant employee area 110, a counter 112, and a product display 114 located behind the counter 112. One of skill in the art in possession of the present disclosure will recognize that the physical merchant location 100 is just one of a plurality of different types of locations (including those not associated with merchants) where the application provisioning system discussed below may be utilized while remaining within the scope of the present disclosure.

In a specific example, the physical merchant location 100 may be a restaurant, the merchant employee area 110 a kitchen, the counter 112 an ordering counter, and the product display 114 a menu. In another example, the physical merchant location 100 may be a clothing store, the merchant employee area 110 a clothing stock room, the counter 112 a display for clothing accessories for purchase, and the product display 114 a clothing advertisement for one or more clothing products available at the physical merchant location 100. However, while a few examples of physical merchant locations are discussed below, locations at which applications are automatically provisioned may also include non-merchant physical locations such as, for example, a user's car, home, or place of work, a natural area such as a park, and/or any other locations that may be associated with the use of particular applications on the user device.

Figure 2:
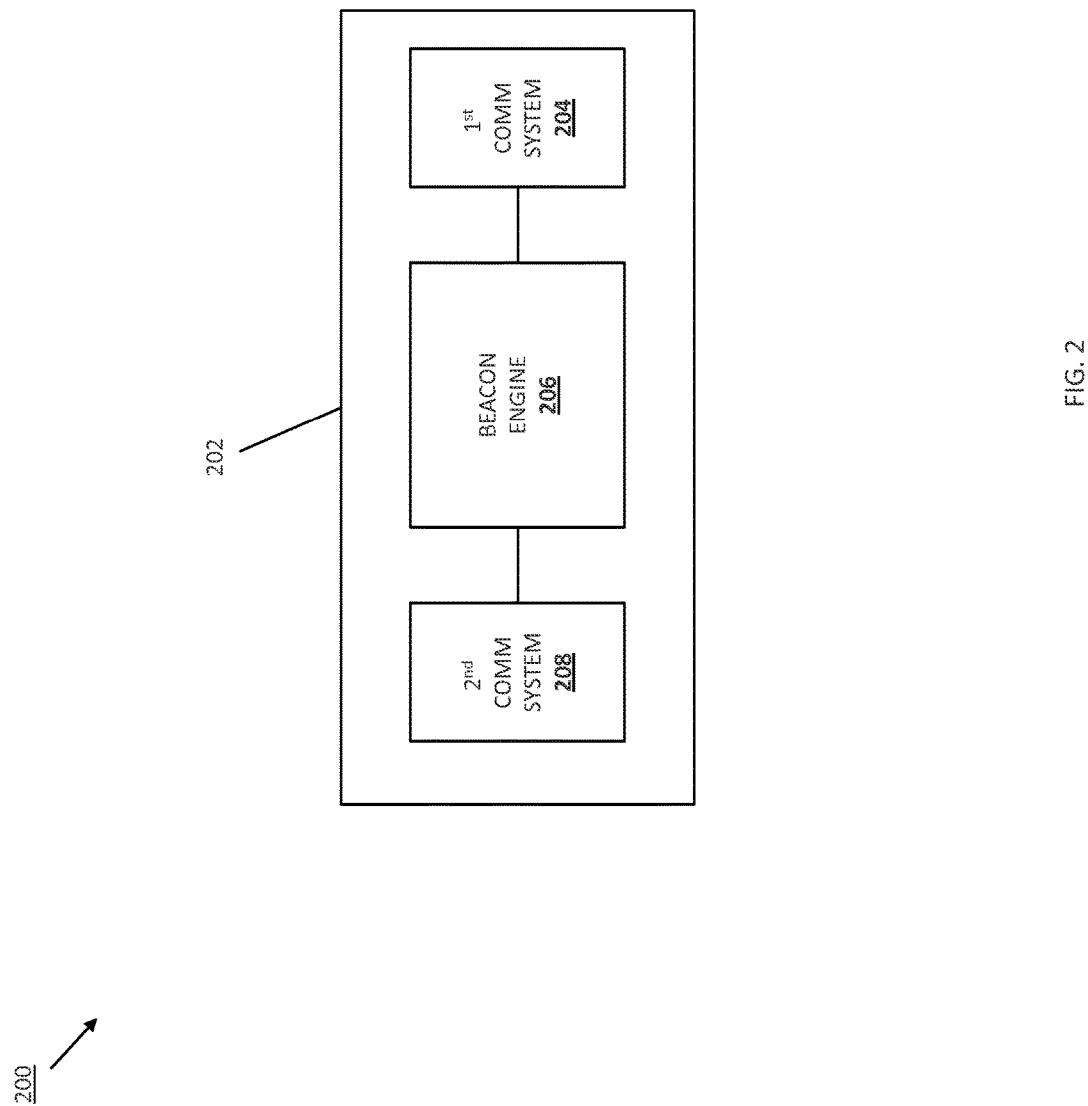
FIG. 2 is a schematic view illustrating an embodiment of a beacon device.

Referring now to FIG. 2, an embodiment of a beacon device 200 is illustrated. The beacon device 200 includes a chassis that houses a first communications system 204 such as, for example, a Wifi communications system. The first communications system 204 is coupled to a beacon engine 206 that may be provided by instructions on a memory system (not illustrated) in the beacon device 200 that, when executed by a processing system (not illustrated) in the beacon device 200, causes the processing system to perform the functions of the beacon devices 200 discussed below. The beacon engine 206 is coupled to a second communication system 208 such as, for example, a Bluetooth communication system, a Bluetooth® Low Energy (BLE) communication system, a near field communication (NFC) system, and/or a variety of other communication systems known in the art. While a few examples of communications components in the beacon device 200 have been described, one of skill in the art will recognize that other communications devices, as well as other components that have been omitted for clarity of discussion and illustrated, may be included in the beacon device 200 and will fall within the scope of the present disclosure. One of skill in the art will recognize that the components described above allow for the beacon device to be provided in a relatively small form factor such that it may be placed inconspicuously almost anywhere. The chassis 202 of the beacon device 200 may include any of a variety of features that allow for the coupling of the beacon device to different areas in a physical merchant location, discussed below.

Figure 3B:
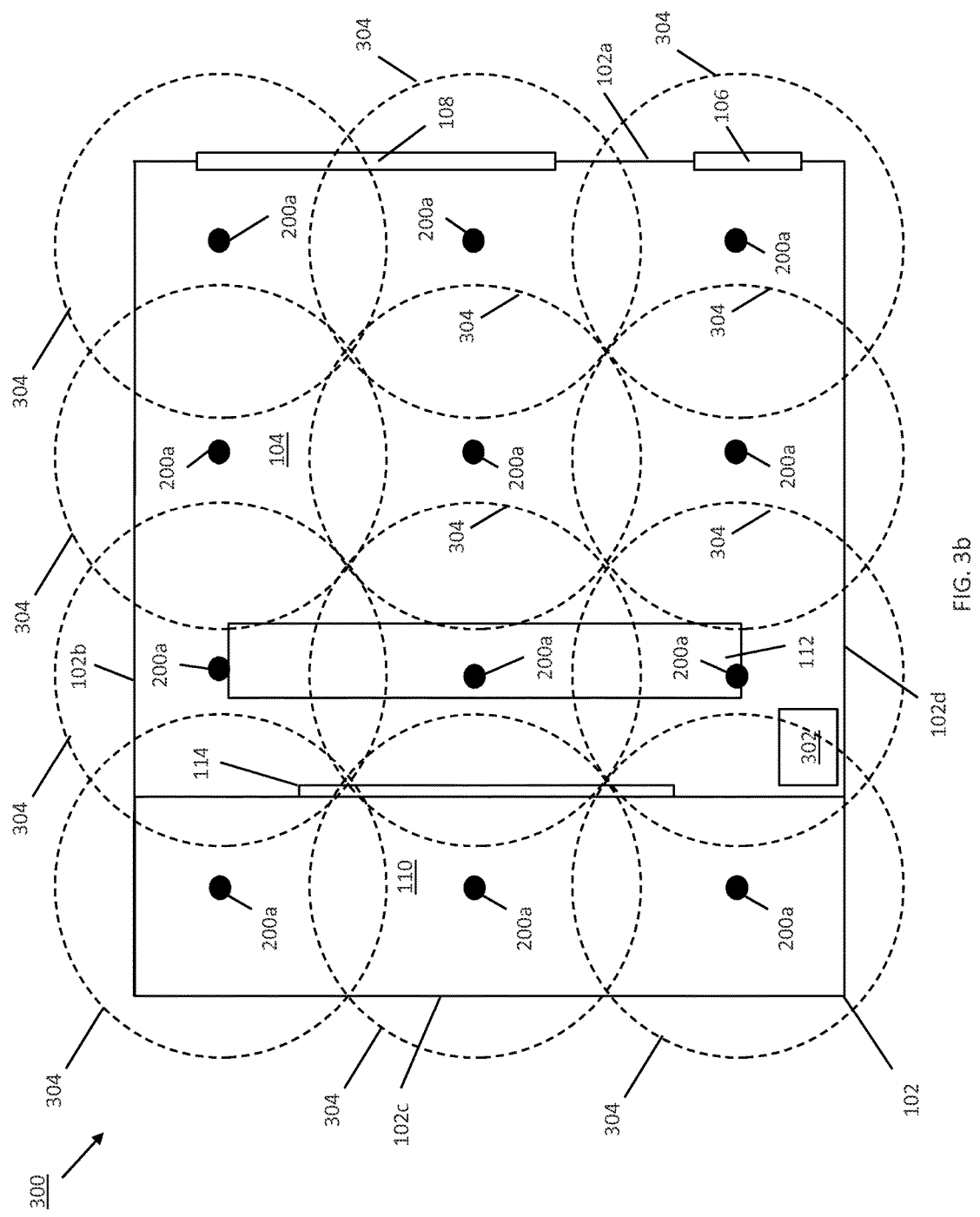
FIG. 3b is a schematic top view illustrating an embodiment of the application provisioning system of FIG. 3a with the beacon devices providing communication areas.

Referring now to FIGS. 3a and 3b, an embodiment of a portion of an application provisioning system 300 is illustrated. As illustrated in FIG. 3a, the application provisioning system 300 may be provided by positioning a plurality of the beacon devices 200, discussed above with reference to FIG. 2, in and around the physical merchant location 100, discussed above with reference to FIG. 1. In the illustrated embodiment, a plurality of beacon devices 200a are positioned in and around the physical merchant location 100. As discussed above, the beacon devices 200 may be sized such that they may be inconspicuously positioned virtually anywhere in or around the physical merchant location 100. For example, the beacon devices 200a may be positioned on the ceiling of the physical merchant location 100, in the product display counter 112, and in the product display 116. Each of the beacon devices 200 in the application provisioning system 300 may be configured to wirelessly communicate, via its first communications system 204, with a merchant network communication device 302 such as, for example, a Wifi wireless router connected to a network such as the Internet, a server, and/or other computing system known in the art.

Referring now to FIG. 3b, in operation, each of the beacon devices 200 is configured to create a communication area 304 with its second communications system 204. For example, the second communications system 204 in each beacon device 200 may be BLE communications device that provides an approximately 100 foot radius communications area. However, other communications systems providing other communications areas are envisioned as falling within the scope of the present disclosure. As can be seen in the illustrated embodiment, the beacon devices 200 may be positioned in and around the physical merchant location 100 such that the communications areas 304 abut, overlap, or otherwise provide coverage for any area of interest within and around the physical merchant location 100. As such, one of skill in the art in possession of the present disclosure will appreciate that different configurations of the beacon devices 200 within and around the physical merchant location 100 may be selected to cover any area within and around the physical merchant location 100 with a communications area 304. As discussed in further detail below, each of the beacon devices 200 are configured to communicate with user devices within their respective communications area 304 (e.g., using the second communication system 208) to collect data, and then send that data to the merchant network communication device 302 (e.g., using the first communication system 204) such that the data may be provided to a merchant device, a system provider device, and/or any other device operating to provide the application provisioning discussed below. One of skill in the art will recognize that the use of BLE communication devices for communication between the beacon devices 200a and user devices may be utilized to provide for low power communications in the background of a user device (e.g., when the user device is not being actively used by the user).

In the embodiments illustrated and discussed below, the beacon devices 200 and their communications areas 304 are not illustrated for clarity of illustration and discussed, but it should be understood that the communications and retrieval of information from beacon communication devices, and in some cases the provision of that information to a system provider device, may be accomplished using beacon devices providing communications areas such as the beacon devices 200 and communications areas 304 illustrated in FIGS. 3*a* and 3*b*. However, in some embodiments, the beacon devices 200*a* may be omitted from the application provisioning system 300 and any communications between the user devices, the merchant devices, and/or the system provider devices may be provided over other networks (e.g., Local Area Networks (LANs), the Internet, etc.) via other communications technologies (e.g., Bluetooth, NFC, Wi-Fi, etc.). Thus, while a specific example of an application provisioning system 300 using beacon devices is provided, one of skill in the art in possession of the present disclosure will recognize that applications may be automatically provisioned using a wide variety of other communication systems while remaining within the scope of the present disclosure.

FIGS. 1, 3*a*, and 3*b* illustrate a physical merchant location 100 that is a single building, and the beacon devices 200 are positioned to provide communications areas 304 that cover the interior of that single building and an area outside the front of that single building. However, beacon devices 200 may be positioned virtually anywhere to retrieve information associated with a physical merchant location 100. For example, the physical merchant location may be located adjacent to or associated with a parking lot, and beacon devices may be positioned around that parking lot, at the entrances or exits of that parking lot, and/or anywhere else relative to that parking lot in order to collect and send information from beacon communication devices to the system provider device. In another example, the physical merchant location may be located in a mall, and beacon devices may be positioned around that mall, at the entrances or exits of that mall, and/or anywhere else relative to that mall in order to collect and send information from beacon communication devices to the system provider device. In some examples, the first communication system may be connected to Wifi networks available outside the physical merchant location in order to communicate collected information to a system provider device. In other examples, the first communication system may be a cellular communications system that allows the beacon devices to be positioned anywhere in range of a cellular communications tower, allowing beacon devices in the merchant to be positioned in virtually any physical location when providing the application provisioning system.

Figure 4:
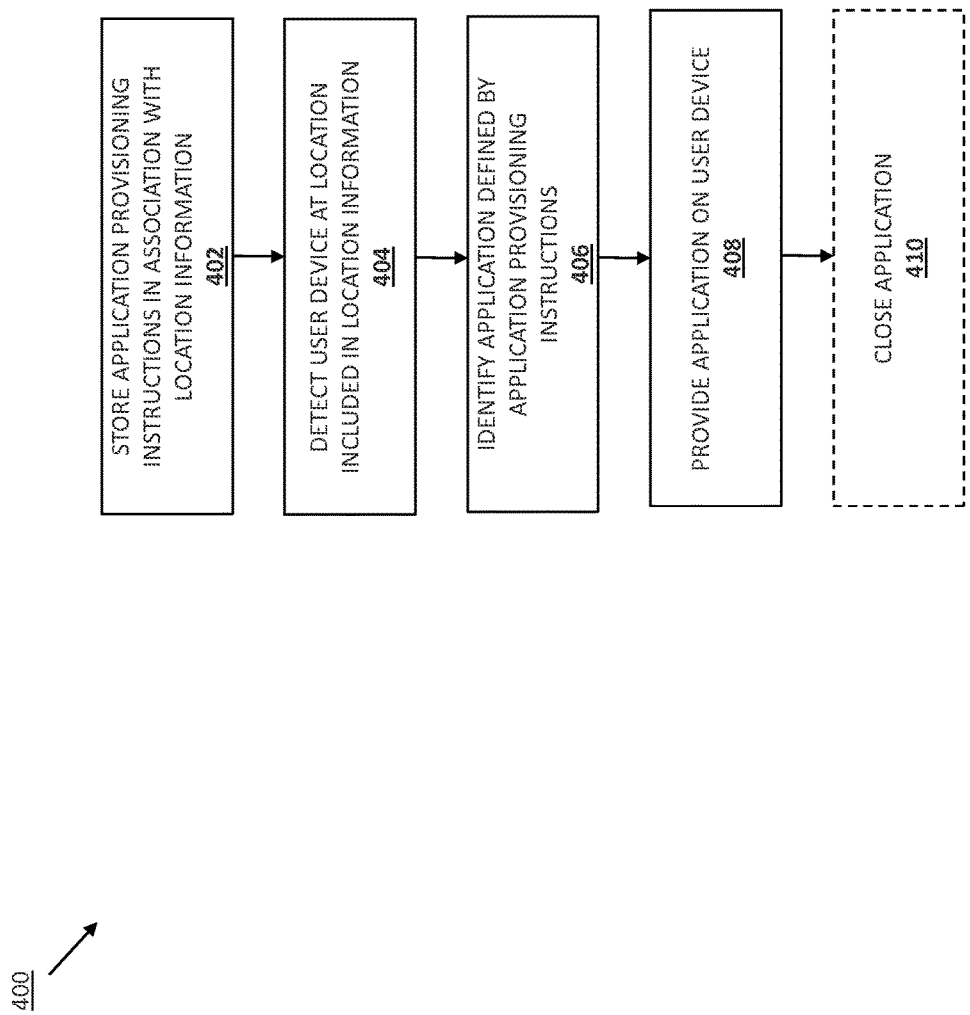
FIG. 4 is a flow chart illustrating an embodiment of a method for providing applications.

Referring now to FIG. 4, an embodiment of a method 400 for provisioning applications is illustrated. In the embodiments discussed below, a user device of a user is a "system provider device" that operates to store application provisioning instructions and location information, detect when the user device is located in a location defined by the location information, identify applications defined by the application provisioning instructions, and provide applications on the user device. However, in other embodiments such functionality may be provided by or with the assistance of a system provider device (such as, for example, the payment service provider device, discussed below) that is separate from the user device and that communicates with the user device over a network. As such, operations discussed as being performed by the user device below may also be performed by a system provider device in communication with the user device over the network. For example, application provisioning instructions and location information may be communicated by the user device to the system provider device over the network, the detection of the user device in a location defined by the location information may be accomplished by the user device communicating its location over the network to the system provider device and the system provider device checking that location against the location information, the system provider device may identify applications defined by the application provisioning instructions, and the system provider device may communicate with the user device over the network to provision on the user device. As such, the functionality of the application provisioning system may be performed using a one or more systems, just a few of which are explicitly described below.

In some embodiments, the user device discussed below may include an auto-provisioning application that controls the automatic provisioning of applications on the user device. As such, any actions associated with the application provisioning system including receipt, determination, and/or storage of application provisioning settings, location information, and/or other details that determine how applications are automatically provisioned on the user device, as well as any functionality of the user device including detecting a location determining application provisioning instructions for that location, identifying applications, and providing applications on the user device, may be performed by or in conjunction with the auto-provisioning application on the user device.

The method 400 begins at block 402 where application provisioning instructions are stored in association with location information. In an embodiment, at block 402, the application provisioning system determines application provisioning instructions that include, for example, application identifiers and/or other information that identifies one or more applications that are included on a user device, along with location information that is associated with a location at which those one or more applications should be automatically provisioned.

In an embodiment, block 402 may be performed by the user device and/or the system provider device automatically and without any explicit instructions from the user. For example, the user device and/or system provider device may monitor the use of applications on the user device and, when applications are used, retrieve location information that indicates the location at which those applications are being used. Use of an application may include, for example, launching that application, performing an action on that application (e.g., making a payment using a payment application, playing a playlist using a music application, etc.), communicating using that application (e.g., posting an image using a social media application), and/or a variety of other application uses known in the art. Location information may include location coordinates (e.g., Global Positioning System (GPS) coordinates from a GPS device in the user device), communications associated with a location at which the application is being used (e.g., beacon system communications from at the physical merchant location 100, wireless communications from a car or home, etc.), and/or a variety of other information that may be used to determine that an application is being used in association with a merchant, a physical merchant location, a device of a user, and/or any other location.

Over time, the user device may determine (or communicate to a system provider device, which then determines) locations at which one or more applications on the user device are commonly used. In some embodiments, upon determining that a particular application has been used at the same location a predetermined numbers of times, the user device may associate that location (via location information) with an identifier for that particular application (via application provisioning instructions) in a database. As such, applications provisioning instructions that identify applications on the user device may be associated with locations at which those applications should be provided based on previous uses of those applications at those locations by the user. In other embodiments, the automatic identification of applications associated with locations may be based on the time of day or year (e.g., a user may utilize map/direction applications during rush hour, weather applications when they are outside during a rainy season, etc.)

In some embodiments, application provisioning instructions may be automatically determined by the user device and/or the system provider device based on application actions by other users (e.g., users not associated with the user device). For example, the system provider device may determine other users that utilize the application provisioning system that are associated with the user or that have similar traits as the user (e.g., other users that are friends of the user through a social network, other users that are contacts of the user, other users in the same age range as the user, other users in the same income range as the user, other users having the same buying habits as the user), which may allow the system provider device to identify application used by those other users at particular locations and provide them to the user when they are in those or similar locations. As such, a user entering a restaurant they have never entered before may be automatically provided a restaurant review application and a restaurant specific application due to their friends typically using those applications when they enter the restaurant, or due to other users with similar traits typically using those applications when they enter the restaurant.

In an embodiment, application provisioning instructions may also include the manner in which the applications should be provided. For example, application provisioning instructions for an application may include instructions to launch an application such that it may be immediately used by the user, to provide an application icon for display to the user (e.g., in a pop-up window, on a lock screen of the user device, etc.) such that the user may quickly launch the application associated with that application icon, to provide an application directed to an application subsection (e.g., a payments page of a payment application, a particular website on an Internet browser application, etc.), and/or any other details that affect how the application is provisioned to the user. As such, at block 402, the user device and/or system provider device may not only detect the use of the application at the location, but particulars about that use (e.g., what subsection of the application was used, where an Internet browser application was directed to, etc.), and those details may be stored as part of the application provisioning instructions that are associated with the location information in the database.

Figure 5A:
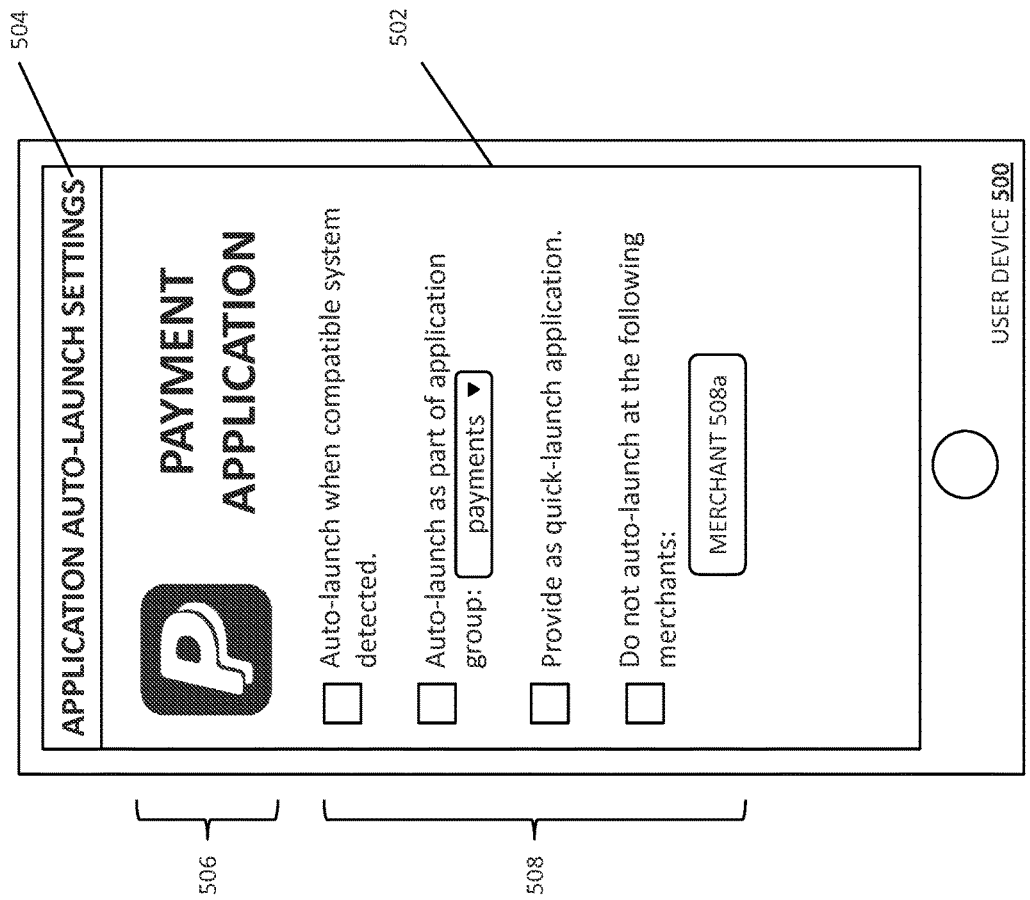
FIG. 5a is a screen shot illustrating an embodiment of a user device displaying an application provisioning settings screen.
Figure 5B:
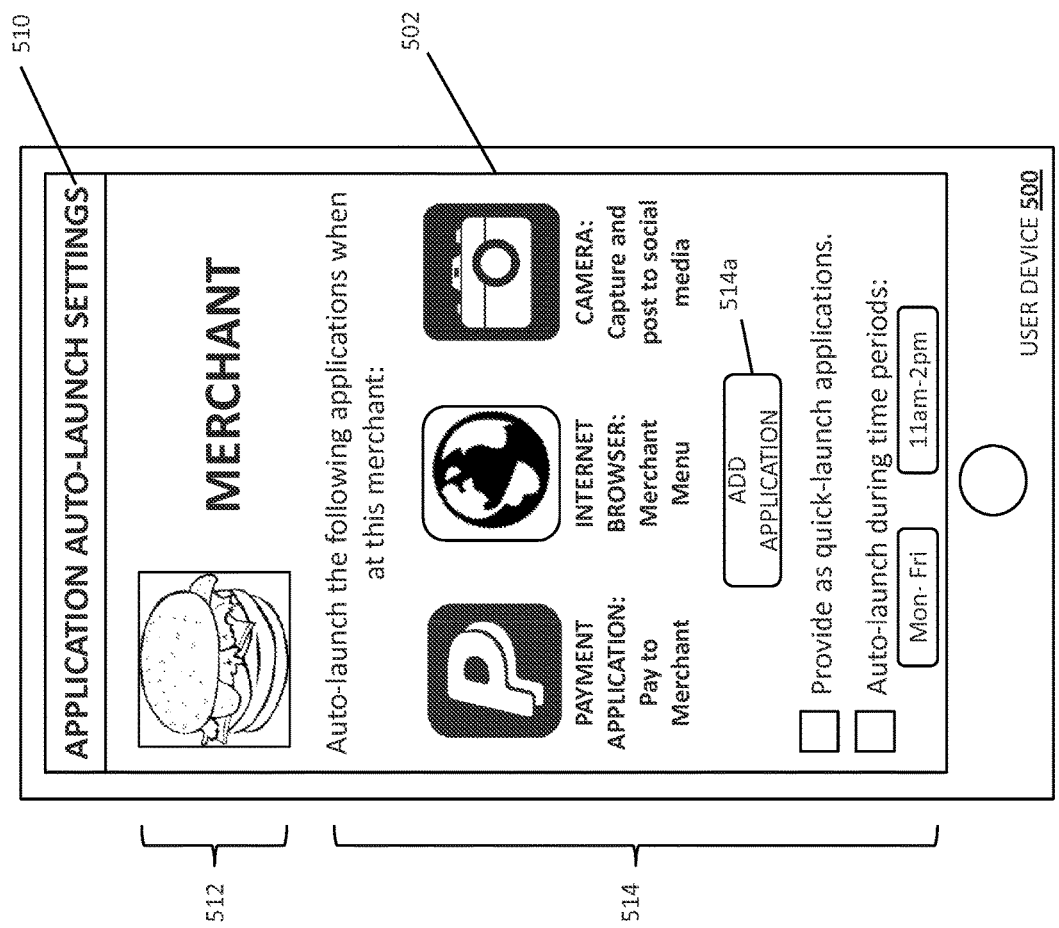
FIG. 5b is a screen shot illustrating an embodiment of a user device displaying an application provisioning settings screen.
Figure 5C:
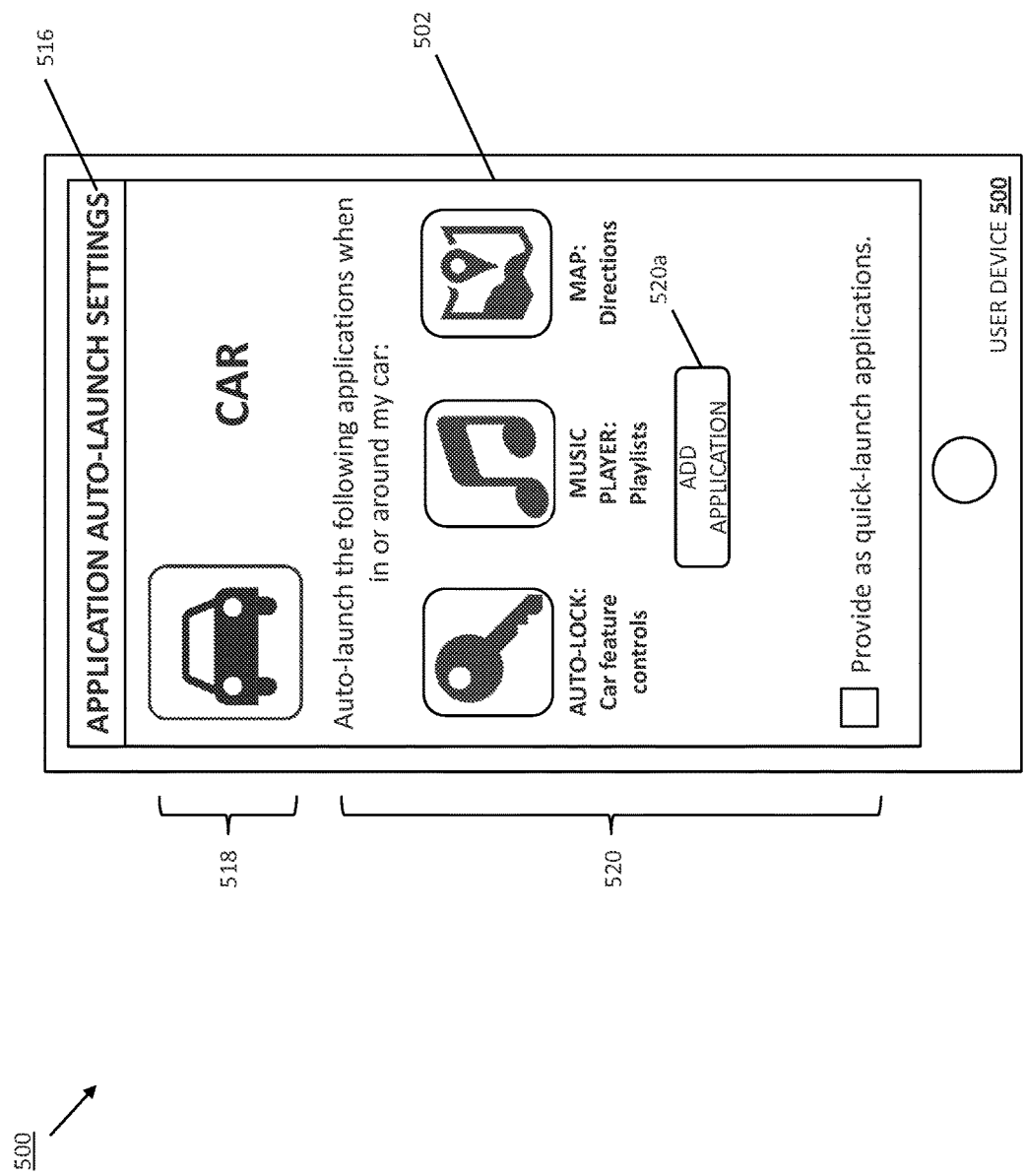
FIG. 5c is a screen shot illustrating an embodiment of a user device displaying an application provisioning settings screen.

Referring now to FIGS. 5a, 5b, and 5c, an embodiment of a user device 500 is illustrated to provide examples of user-provided application provisioning instructions. As discussed above, those user-provided application provisioning instructions may be provided and stored in the user device, or provided through the user device to the system provider device. Furthermore, while the application provisioning instructions are discussed below as being provided by the user, one of skill in the art in possession of the present disclosure will recognize how the application provisioning instructions discussed in FIGS. 5a, 5b, and 5c may be determined automatically by the user device (as discussed above) while remaining in the scope of the present disclosure.

FIG. 5a illustrates the user device 500 including a display 502 displaying an application provisioning settings screen 504 that includes an application identifying section 506 and a plurality of application provisioning instructions 508. As discussed below, the application launch settings screen 504 (and others like it) may be provided in response to a number of scenarios. In the example discussed below, the application launch settings screen 504 may be part of the settings for the application, the settings for the user device 500, the settings for an auto-provisioning application, and/or other settings provisioning scenarios known in the art. The application identifying section 506 includes an application icon and identification information about an application that is included on the user device 500 and that is to be provided when the user device is detected as being in a particular location. The application provisioning instructions 508 in the illustrated embodiment include an instruction to automatically launch the application when a compatible system is detected (e.g., when a communication with a merchant device indicates that the merchant supports the application), an instruction to automatically launch the application as part of an application group (e.g., a payment application group in the illustrated embodiment that may include a plurality of payment related applications that are launched in locations where they may be used with a merchant), an instruction to provide the application as a quick launch application (e.g., provide an application icon for the application in a quick launch window, discussed in further detail below), and an instruction to suppress the automatic launch of the application at particular merchants (e.g., merchant 508a in the illustrated embodiment).

The application provisioning instructions 508 illustrated in FIG. 5a include just a few examples of application provisioning instructions that may be used to define how the application is provided on the user device 500 based on its location, and may be selected by the user to have those application provisioning instructions stored in a database. Using the specific example of the payment application illustrated in FIG. 5a, if the user would like the payment application to be launched at any merchant that supports it (e.g., accepts payments via the payment application), that user may select to have the payment application automatically launched when compatible merchant systems are detected (e.g., a merchant device communication indicating that that application is supported). If the user has an application group of payment applications that are launched at one or more locations (i.e., according to another set of application group provisioning instructions), the user may selected to automatically launch the payment application as part of that application group. If the user would like the application icon for the payment application presented to them (e.g., on a lock screen of the user device 500, discussed below) when they are detected at a location, they may select to have the application provided as a quick-launch application. If the user is often in a merchant location at which the payment application would be automatically provided (e.g., according to other application provisioning instructions), but does not use the payment application at that merchant location, the user may select to have the provisioning of that application suppressed at that particular merchant location. Thus, one of skill in the art will recognize how a user may mix and match any of a variety of application provisioning instructions to define precisely how the payment application may be automatically provided on the user device 500.

FIG. 5b illustrates the user device 500 displaying an application launch settings screen 510 that includes a location identifying section 512 and a plurality of application provisioning instructions 514. As discussed below, the application launch settings screen 510 (and others like it) may be provided in response to a number of scenarios. In the example discussed below, the application launch settings screen 504 may be part of the settings for a merchant application, the settings for the user device 500, the settings for an auto-provisioning application, and/or other settings provisioning scenarios known in the art. Furthermore, the application launch settings screen 510 may be provided in response to a request from the user, in response to communications with a merchant device (e.g., via the beacon system discussed above), and/or in response to any communications discussed herein with regard to the application provisioning system. The location identifying section 512 includes a merchant icon and identification information about a merchant that is associated with location information and at which applications are to be provided when the user device is detected as being at the merchant location. The application provisioning instructions 514 include an instruction to automatically launch a plurality of applications (e.g., the payment application directed to a pay-to screen for the merchant, an Internet browser directed to a menu of the merchant, and a camera application directed to capturing and posting images to a social media site) when the user is determined to be at the merchant location, as well as an instruction to provide the application as a quick launch application (e.g., provide an application icon for the application in a quick launch window, discussed in further detail below), and an instruction to only automatically launch the applications at the merchant during particular times (e.g., between 11 am and 2 pm Monday through Friday in the illustrated embodiment).

The application provisioning instructions 514 illustrated in FIG. 5*b* include just a few examples of application provisioning instructions that may be used to define how applications are provided on the user device 500 when the user is at the merchant location, and may be selected by the user to have those application provisioning instructions stored in a database. Using the specific example of the restaurant merchant illustrated in FIG. 5*b*, the application provisioning instructions provide for the automatic launching of a payment application, an Internet browser application, and a camera application, with each directed to a merchant specific subsection of that application that is used by the user when at the merchant location. As illustrated, the user may add additional applications to be launched at the merchant location using an add application button 514*a*, may select to have the applications provided as quick-launch applications, and/or only have those applications launched when the user is at the merchant location at particular times. Thus, one of skill in the art will recognize how a user may mix and match any of a variety of application provisioning instructions to define precisely how applications may be automatically provided on the user device 500 when at the merchant location.

FIG. 5*c* illustrates the user device 500 displaying an application launch settings screen 516 that includes a device identifying section 518 and a plurality of application provisioning instructions 520. As discussed below, the application launch settings screen 516 (and others like it) may be provided in response to a number of scenarios. In the example discussed below, the application launch settings screen 504 may be part of the settings for a device (e.g., other than the user device 500), settings for the user device 500, the settings for an auto-provisioning application, and/or other settings provisioning scenarios known in the art. Furthermore, the application launch settings screen 516 may be provided in response to a request from the user, in response to communications with the device (e.g., the user's car in this embodiment), and/or in response to any communications discussed herein with regard to the application provisioning system. The device identifying section 518 includes a device icon and identification information about the device (both related to a car of the user in this embodiment). The application provisioning instructions 520 include an instruction to automatically launch a plurality of applications (e.g., the auto-lock application directed to remotely controlling features of the car, a music player application directed to one or more music playlists, and a map application directed to a directions section for finding directions between a plurality of locations) when the user is determined to be co-located with the car, as well as an instruction to provide the application as a quick launch application (e.g., provide an application icon for quick launch, discussed in further detail below).

The application provisioning instructions 520 illustrated in FIG. 5*c* include just a few examples of application provisioning instructions that may be used to define how applications are provided on the user device 500 when the user is co-located with another device, and may be selected by the user to have those application provisioning instructions stored in a database. Using the specific example of the car illustrated in FIG. 5*c*, the application provisioning instructions provide for the automatic launching of a car feature control application, a music player application, and a map application, each directed to a particular subsection of that application that is used by the user when co-located with the car. As illustrated, the user may add additional applications to be launched when the user is co-located with the car using an add application button 520*a*, and/or may select to have the applications provided as quick-launch applications. Thus, one of skill in the art will recognize how a user may mix and match any of a variety of application provisioning instructions to define precisely how applications may be automatically provided on the user device 500 when using their car.

In other, non-illustrated examples, application provisioning instructions may be provided for a user's home and/or a user's office, and such locations may be determined, for example, by detecting when the user device logs into a local area network provided at that location. In another non-illustrated example, application provisioning instructions may be provided for particular events (e.g., sporting events, music events, etc.), and such locations may be detected, for example, based on social media posts by the user including mentions of the event and/or images from the event. In another non-illustrated example, application provisioning instructions may be provided for parks or other nature areas, and such locations may be detected, for example, by reviewing a calendar of the user to determine when the user is planning on being located at the park or other nature area.

Thus, a wide variety of different types of application provisioning instructions may be associated with a wide variety of different types of location information in the database at block 402. As discussed in further detail below, location information associated with an application identified by application provisioning instructions may include any location that includes an application compatible system (e.g., that communicates via a merchant device of a merchant that supports that application), location coordinates, merchant names, merchant types, device names, device types, social media posts from a given location, calendar appointments that indicate the location, etc. As such, "location information" is not limited to geographic coordinates, but rather refers to locations at which the associated applications are determined to be useful for the user, and as described below may be identified via any distinguishable identifier or manner known in the art.

The method 100 then proceeds to block 404 where the user device is detected at a location included in the location information. In an embodiment, the user device receives or retrieves location data or some other location communication, compares that location data/communication to the location information that was stored in the database in block 402, and determines that the location data/communication is associated with a location included in the location information in the database. While several examples of location data/communications are provided below that may be used to detect that the user device is at a location included in the location information, one of skill in the art in possession of the present disclosure will recognize that other location data/communications may be used to determine that a user is at a location while remaining within the scope of the present disclosure.

Figure 6:
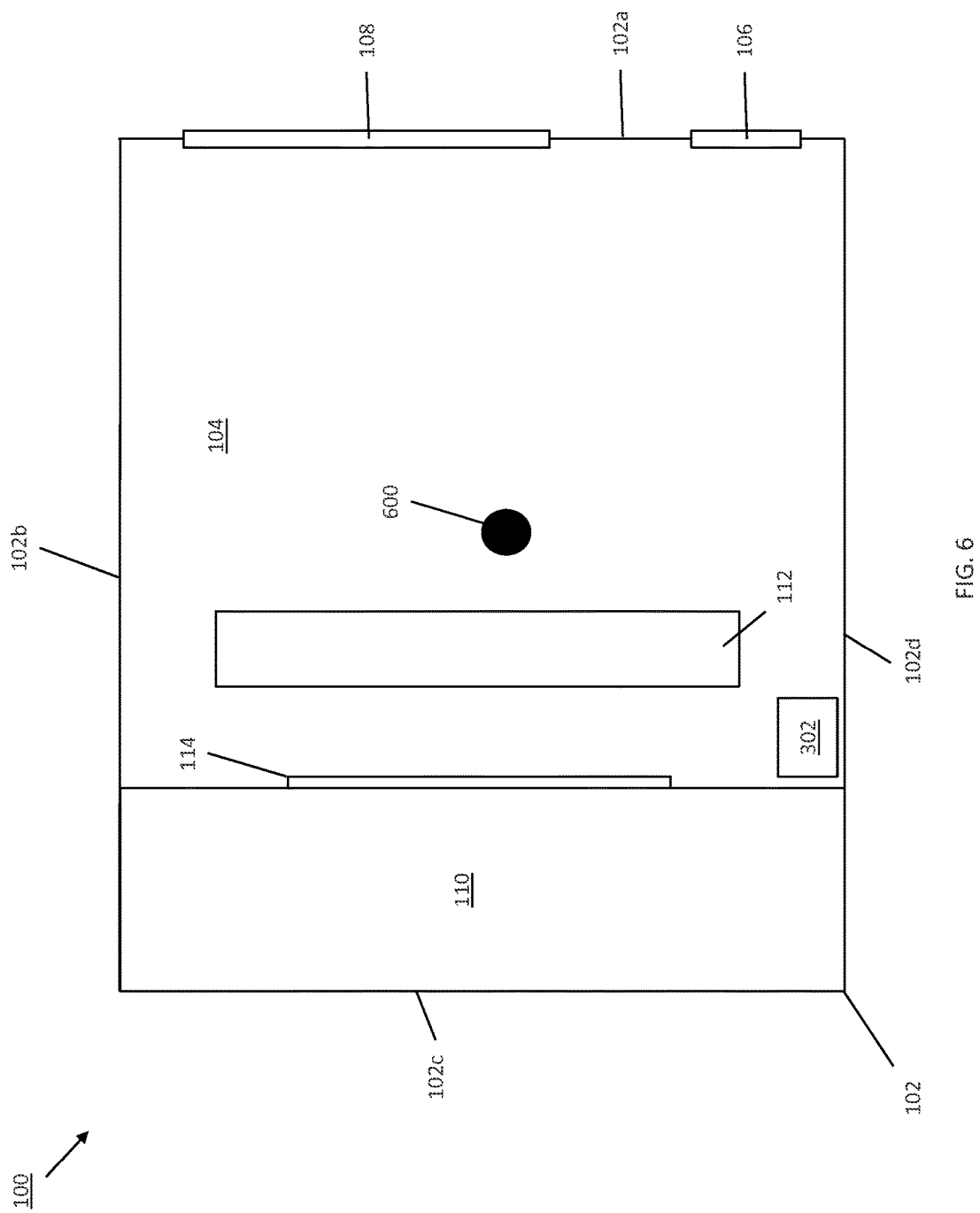
FIG. 6 is a schematic top view illustrating an embodiment of a customer located at the physical merchant location of FIG. 1.

Referring now to FIG. 6, an embodiment of a user 600 including a user device (e.g., the user device 500 discussed above) that is located at the physical merchant location 100 discussed above is illustrated. In some embodiments, the user device of the user 600 may retrieve location data at block 404 from a location determination device in the user device, compare that location data to the location information in the database of the user device, and determine that the location data matches a location in the location information. In some embodiments, the user device of the user 600 may receive location communications at block 404 from a merchant device at the physical merchant location 100 (e.g., the beacon system discussed above, a Wi-fi communication system, a Bluetooth communication system etc.), compare that location communication to the location information in the database of the user device, and determine that the location communication matches a location in the location information. For example, the merchant may communicate a merchant identifier, a merchant type, an advertisement that the merchant supports one or more applications, and/or a variety of other information that may allow the user device to determine that the physical merchant location and/or the merchant are included in the location information in the database of the user device.

In some embodiments, the user device of the user 600 may receive location communications at block 404 from a device that is in communication with the user device (e.g., a communication system in a car, a home, etc.), compare that location communication to the location information in the database of the user device, and determine that the location communication matches a location in the location information. For example, the communication system in a car or home may communicate a car or home identifier, an advertisement that the car or home supports one or more applications, and/or a variety of other information that may allow the user device to determine that the car or home is included in location information in the database of the user device.

In yet other embodiments, other types of location data and/or location communication may be used to determine that the user device is located at a location that is included in the location information at block 404. For example, as discussed above, information associated with local area network connections, social media posts by the user, the user's calendar, and/or other sources may be utilized to determine or infer the location of the user, and thus be used by themselves or in conjunction with the other location data/communications discussed above to determine the location of a user device, confirm a location of a user device, and/or other provide to some degree of confidence that the user device is at a location included in the location information in the database.

The method 400 then proceeds to block 406 where application(s) are identified that are defined by the application provisioning instructions. In an embodiment, the user device uses the location that was determined to be included in the location information at block 404 to determine one or more application provisioning instructions that are associated with that location and that identify one or more applications. As discussed above, any number of applications may be associated with a location in the application provisioning system, and thus while a plurality of applications are described and illustrated below as being associated with each location, a single application may be associated with a location and automatically provided according to the method 100 while remaining within the scope of the present disclosure.

The identification of the application(s) defined by the application provisioning instructions that are associated with the location detected at block 404 may also include determining whether any other details included in those application provisioning instructions. In an embodiment, at block 406, the user device may check whether the user is at a merchant for which application provisioning is suppressed (e.g., according to the instruction discussed above with reference to FIG. 5a). For example, a communication from a merchant device at the physical merchant location 100 may indicate that the payment application is supported and thus that the user is at a location in which the payment application should be automatically provisioned, but GPS coordinates from the user device may indicate that the user device is at a specific merchant location that the user has instructed to suppress provision of the payment application, and thus the payment application will not be identified at block 406. In another embodiment, at block 406, the user device may check whether a current time period allows the automatic provisioning of one or more applications. For example, a user device may determine it is at a location associated with a merchant for which applications should be automatically provided, but a user may have provided instructions to only provision those applications during a specific time period (as described above with reference to FIG. 5b), and thus the applications will not be identified at block 406 if the current time period does not fall within the user-defined time period. Thus, applications provisioning instructions that identify applications that should be provisioned at a location may also include information on the specific situations in which those applications should be provisioned that must be checked by the user device (in some situations by gathering other data). Similarly, application provisioning instructions may identify a subsection of the applications that should be provisioned in an identified application, and/or any other information that describes how the application is provisioned.

In addition, in some embodiments, an application may be provided to the user device at a location and immediately installed on the user device such that the completed installation of that application identifies that application at block 406. For example, a user may configure their user device to allow applications to be provided and automatically installed at particular locations and/or from particular merchants. As such, a merchant device may provide an application to the user device upon the user device entering the merchant location, and the user device may install that application such that it is identified at block 406 and may be provided at block 408.

The method 400 then proceeds to block 408 where application(s) are provided on the user device. In an embodiment, the user device may provide the applications that were identified at block 406 for display in a variety of manners. For example, as discussed in further detail below, the user device may provide each of the plurality of applications at block 408 by launching each of the applications on the user device such that the user may immediately use those applications. In another example, as discussed in further detail below, the user device may provide each of the plurality of applications at block 408 by providing an application icon for each of the applications for display on the user device such that the user may select the applications they would like to use. In another example, as discussed in further detail below, the user device may provide each of the plurality of applications at block 408 by configuring those applications such that the user may quickly select (e.g., via voice instructions) the applications they would like to use. While a few specific examples are provided below of the provisioning of applications on the user device, one of skill in the art will recognize that applications may be provided on the user device in a variety of manners while remaining within the scope of the present disclosure. Furthermore, while the user device provisioning the application below is illustrated and described as a mobile phone or tablet device, in other embodiments, the systems and methods described herein may be found particularly useful on wearable "smart" devices such as glasses, watches, and/or a variety of other wearable computing systems known in the art.

Figure 7A:
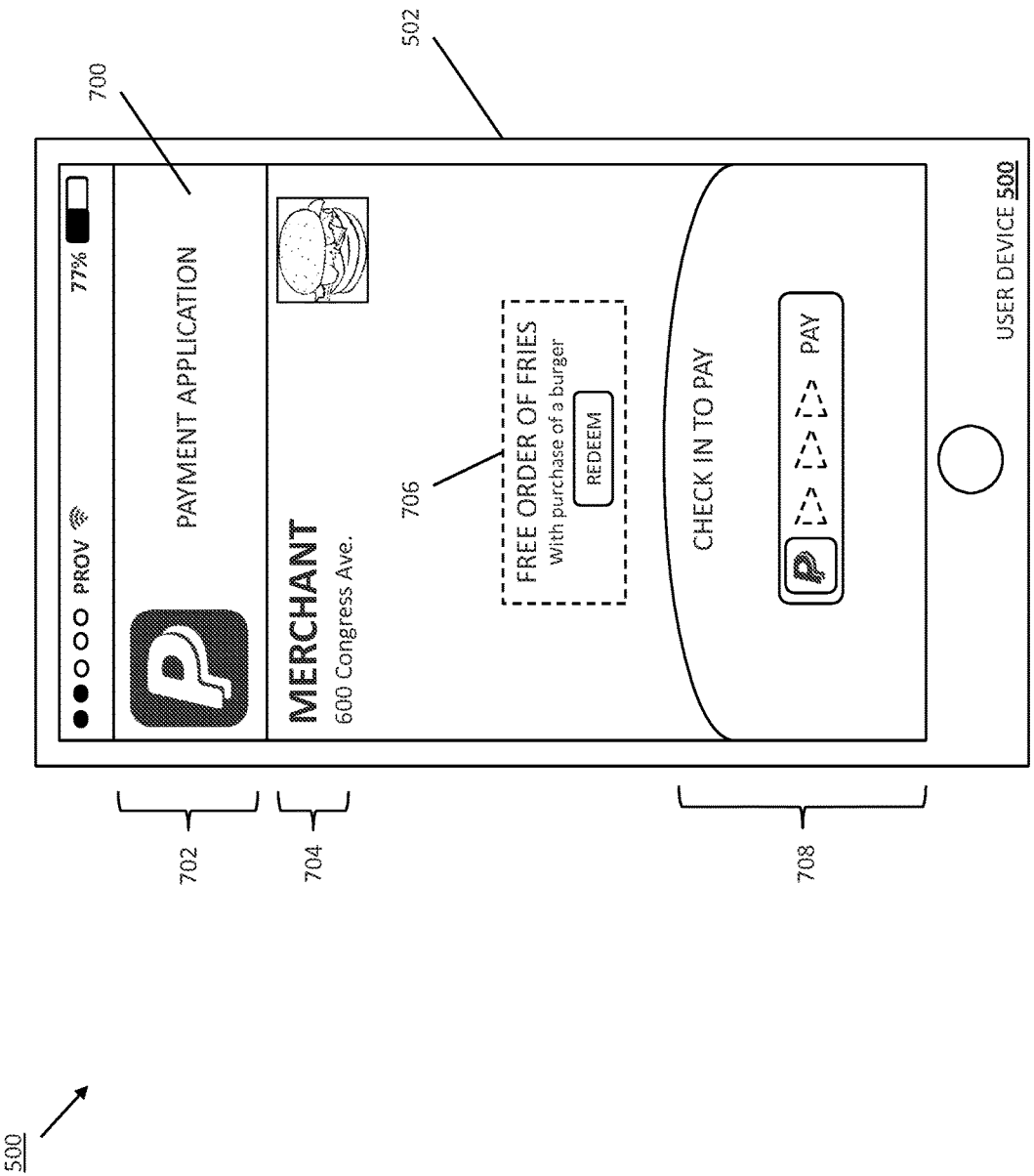
FIG. 7a is a screen shot illustrating an embodiment of a user device displaying an application that has been automatically launched.

Referring now to FIG. 7a, an embodiment of the user device 500 providing an application for display is illustrated. The embodiment illustrated in FIG. 7a continues with the example provided in FIGS. 5b and 6 in which a plurality of applications were associated with a merchant or physical merchant location, and the user was detected as being located in the physical merchant location 100. As such, in FIG. 7a, the user device 500 is illustrated providing a payment application screen 700 for a payment application that has been launched on the user device and directed to a merchant specific payment screen (i.e., for the merchant associated with the physical merchant location in FIG. 6). The payment application screen 700 includes a payment application identifier 702 that identifies the payment application that was launched, a merchant identifier 704 identifying the merchant (or merchant physical location) for which the payment application was launched, a discount coupon 706 provided in the payment application for the merchant, and a payment section 708 that the user may select to make a payment to the merchant.

Figure 7B:
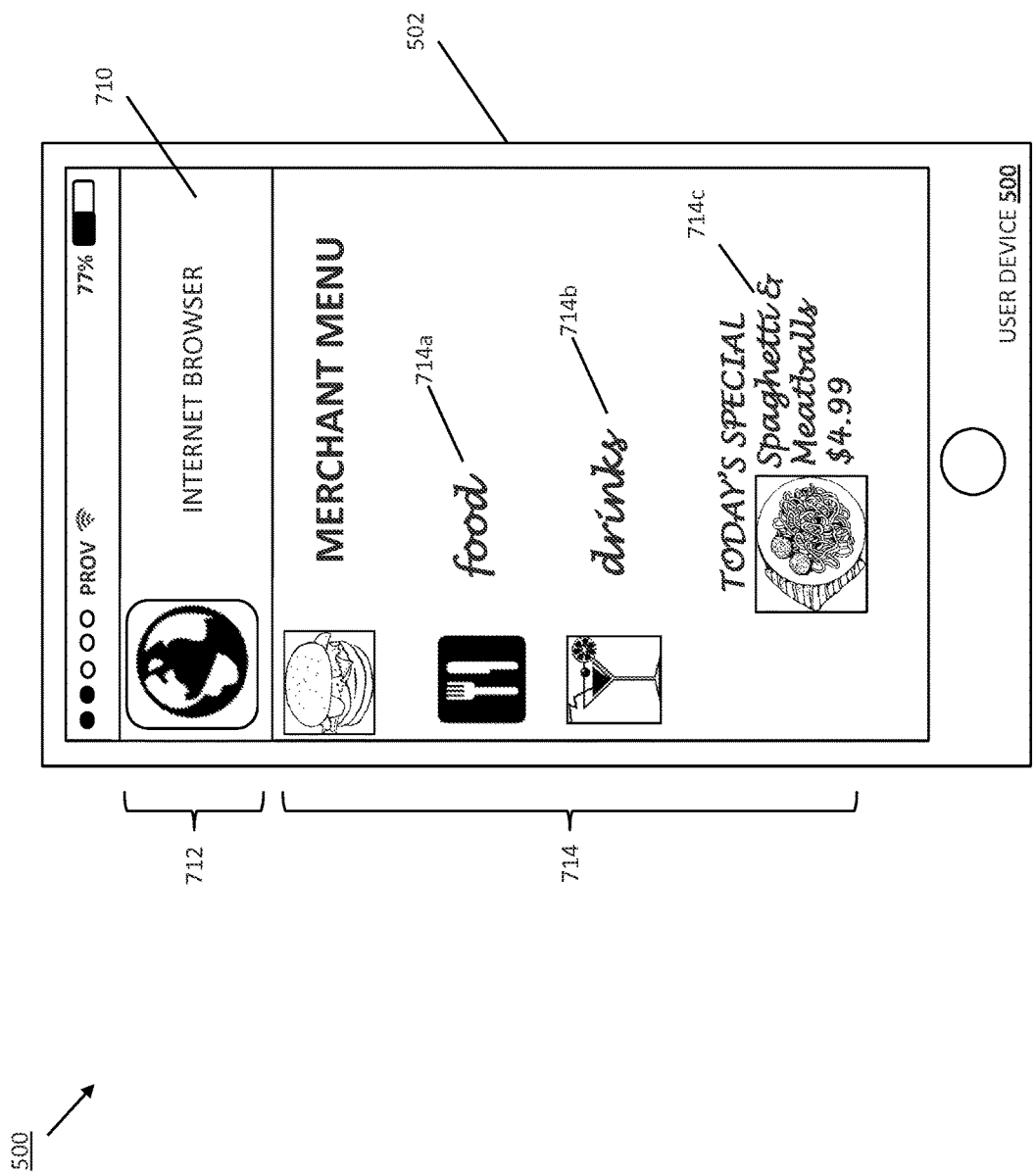
FIG. 7b is a screen shot illustrating an embodiment of a user device displaying an application that has been automatically launched.

Referring now to FIG. 7b, an embodiment of the user device 500 providing an application for display is illustrated. The embodiment illustrated in FIG. 7a continues with the example provided in FIGS. 5b, 6, and 7a in which a plurality of applications were associated with a merchant or physical merchant location, the user was detected as being located in the physical merchant location, and the payment application screen 700 of FIG. 7a was launched as part of the provisioning of a first application. In FIG. 7b, the user device 500 is illustrated providing an Internet browser application screen 710 for an Internet browser application that has been launched on the user device 500 and directed to a merchant specific website (i.e., for the merchant associated with the physical merchant location in FIG. 6). The Internet browser application screen 710 includes an Internet browser application identifier 712 that identifies the Internet browser application that was launched, along with a merchant restaurant website 714 that allows the user to navigate (via webpages accessed through the website) through different menu elements to view, and in some cases select, items for purchase. As such, the merchant restaurant website 714 includes a food link 714a to food items available at the merchant, a drink link 714b to drink items available at the merchant, and a special link 714c to discounted items available at the merchant. In some embodiments, the Internet browser application screen 710 may be specifically associated with a universal resource locator (URL) for the merchant, while in other embodiments, the Internet browser application screen 710 may be determined by the user device by searching for and providing a menu web page provided by the identified merchant (e.g., Internet browser application provisioning instructions may include instructions to search for and provide the Internet browser application directed to the menu webpage for a merchant identified at a location).

As indicated in FIG. 5b, upon being detected as located in the physical merchant location 100, the user device 500 may also provide a camera application screen for a camera application that has been directed to capturing images and posting them on a social media profile. As such, the user device 500 may automatically launch each of the payment application (providing the payment application screen 700), the Internet browser application (providing the Internet browser application screen 710), and the camera application (providing the camera application screen) when the user device 500 detects that it is located at the merchant and/or in the physical merchant location 100. In some embodiments, the application(s) launched at block 408 may be launched traditionally such that they are available for use on the user device 500 similarly to conventionally launched applications (e.g., those launched by a user selecting an application icon). In some embodiments, the application(s) launched at block 408 may be launched such that they are prioritized relative to other applications that are open on user device 500 (e.g., available "on top" or otherwise in a prioritized position relative to other applications currently available on the user device 500).

In some embodiments, the application(s) launched at block 408 may be launched such that the user may quickly switch between each of those applications. For example, the applications may be launched at block 408 such that the user may "swipe" (i.e., a directional touch input known in the art that provides resulting movement of a displayed graphical element) between each of the applications to switch between using the launched applications quickly. Such "swipe" functionality may be implemented, for example, by providing each of the applications with a portion (e.g., the section including the payment application identifier 702 on the payment application screen 700, the section including the Internet browser application identifier 712 on the Internet browser application screen 710, and a similar section on the camera application) that allows a user "swipe" action to move quickly between the applications that were launched at block 408. While an example of "swipe" action to quickly move between launched applications has been described, any user input may provide similar functionality, including the selection of graphical arrow buttons, hardware buttons on the user device, and/or a variety of other input methods known in the art.

Figure 8:
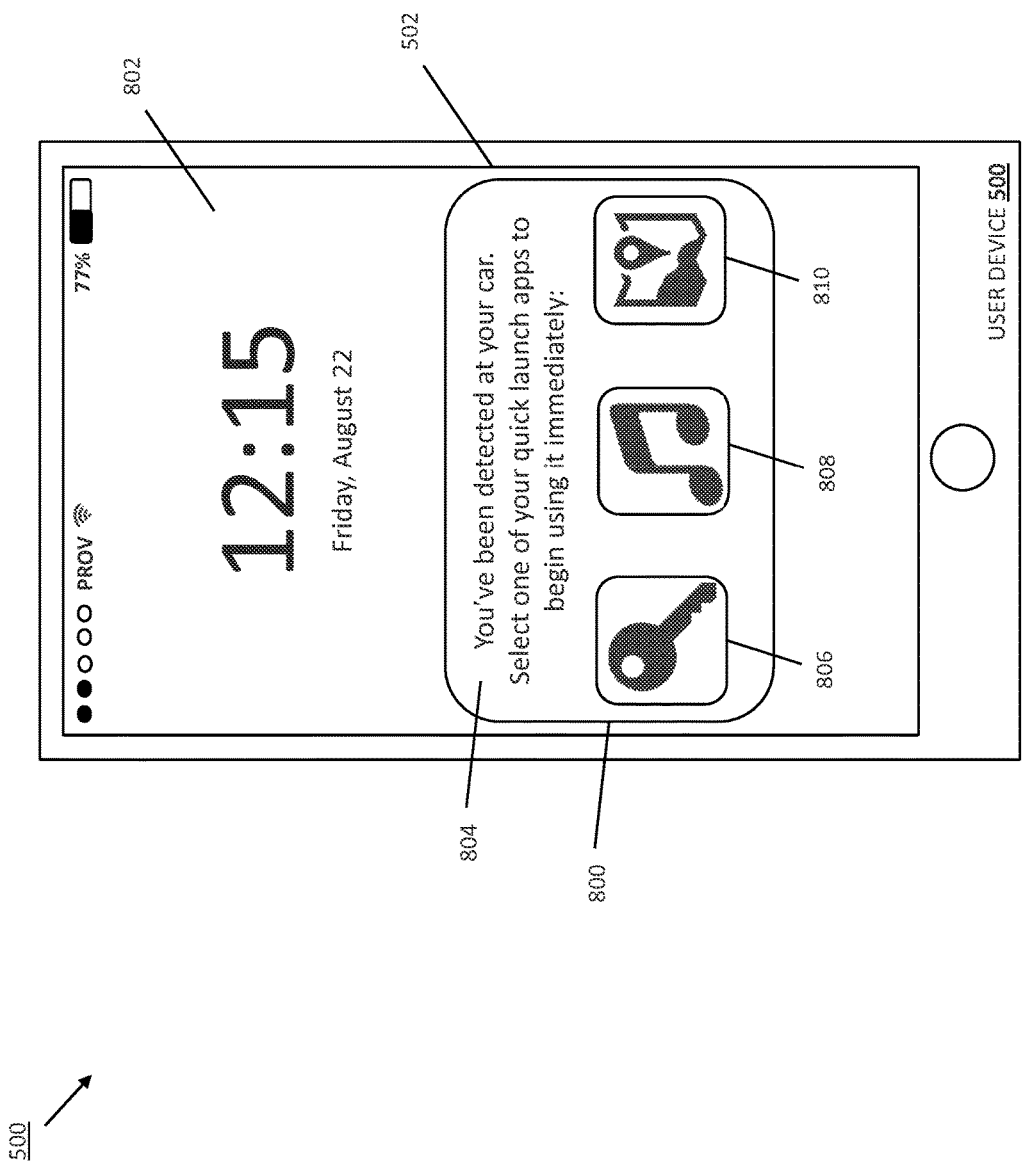
FIG. 8 is a screen shot illustrating an embodiment of a user device displaying applications that have been automatically provided via application icons on a quick-launch window.

Referring now to FIG. 8, an embodiment of the user device 500 providing a plurality of applications for display is illustrated. The embodiment illustrated in FIG. 8 continues with the example provided in FIG. 5c in which a plurality of applications were associated with a device (the user's car) and instructed to "quick launch", and the user is detected as being located in or near their car. As such, in FIG. 8 the user device 500 is providing a quick-launch window 800 that, in the illustrated example, has been provided as a "pop-up" window over a lock screen 802 on the user device 500 (e.g., a screen provided by an operating system on the user device that regulates immediate access to the user device by requiring the user to perform an action such as a gesture, a biometric authentication action, or entering a password in order to gain access to the user device 500). The quick-launch window 800 includes a quick launch message 804 that informs the user that they have been detected at their car and may select one of their quick launch applications to begin using it, as well as a first application icon 806 for the auto-lock application (which may be directed to remotely controlling features of the car as discussed above), a second application icon 808 for the music player application (which may be directed to one or more music playlists as discussed above), and a third application icon 810 for a map application (which may be directed to a directions section for finding directions between a plurality of locations as discussed above).

Thus, applications may be provided for display in a quick-launch mode that results in the provisioning of application icons for those applications such that the user may select any of the applications icons to launch their associated applications and being using them. While the quick launch window 800 has been illustrated and described as being provided over a lock screen 802 on the user device 500, similar quick launch windows may be provided over a home screen on the user device (e.g., a screen that provides access to application icons for applications included on the user device 500), over an application currently being used on the user device 500, and/or in a variety of other situations known in the art.

Furthermore, applications provided at block 408, instead of being provided by launching the applications or providing applications icons for display, may be presented in other manners that allow for the quick access and use of those applications by the user. In an embodiment, upon detecting the user at the location at block 404 and identifying the applications associated with that location, the user device may provide the applications in a voice launchable configuration on the user device. For example, each of the applications associated with the location at which the user has been detected may then be configured such that the user may use a voice activated command to launch that application (e.g., a voice command such as "launch music application"). Such examples may include providing an audible indication that the applications are available for voice-activated launch (e.g., "your car-related applications are available for voice launch"), activation of a voice recognition system for receiving the voice activated launch commands, etc. Similarly, the applications may be configured in a variety of other launchable configurations such that they may be launched using hardware buttons on the user device, hardware buttons on a connected device (e.g., the user's car discussed above), etc.

The method 400 may then proceed to optional block 410 where application(s) are closed. In an embodiment, subsequent to providing the applications at block 408, the user device may monitor a variety of factors to determine whether to close the applications at optional block 410. For example, the user device 500 may monitor its location to determine whether it is no longer at the location detected at block 404 and, if so, automatically close the applications that were provided at block 408. In another example, the user device 500 may monitor the time passed subsequent to launching the applications at block 408 and, if that time exceeds a predetermined amount of time, automatically close the applications that were provided at block 408. Closing applications may include closing a launched application, closing a quick launch window, reconfiguring applications and/or the user device such that the applications may not be voice launched, etc. While a few examples have been provided, one of skill in the art in possession of the present disclosure will recognize that the user device may automatically close any applications provided at block 408 in response to a variety of situations while remaining within the scope of the present disclosure. Furthermore, in other embodiments, optional block 410 may be skipped and the applications provided at block 408 may not be closed following block 408.

Thus, application provisioning systems and methods have been described that automatically provision applications on a user device based on a location of that user device. The systems and methods may identify applications that are associated with a location in which the user is located, and automatically launch those applications or provide their associated application icons for display so that a user does not need to search through the user device for the applications they would like to use. As such, the user may set up (or the user device may automatically determine) which applications on the user device are most useful to the user at different locations, and present only those applications to the user for quick and easy use. As such, the determination and use of applications at any particular location is greatly simplified for the user, resulting in a higher likelihood that the user will use each of the applications they need at any given location.

Figure 9:
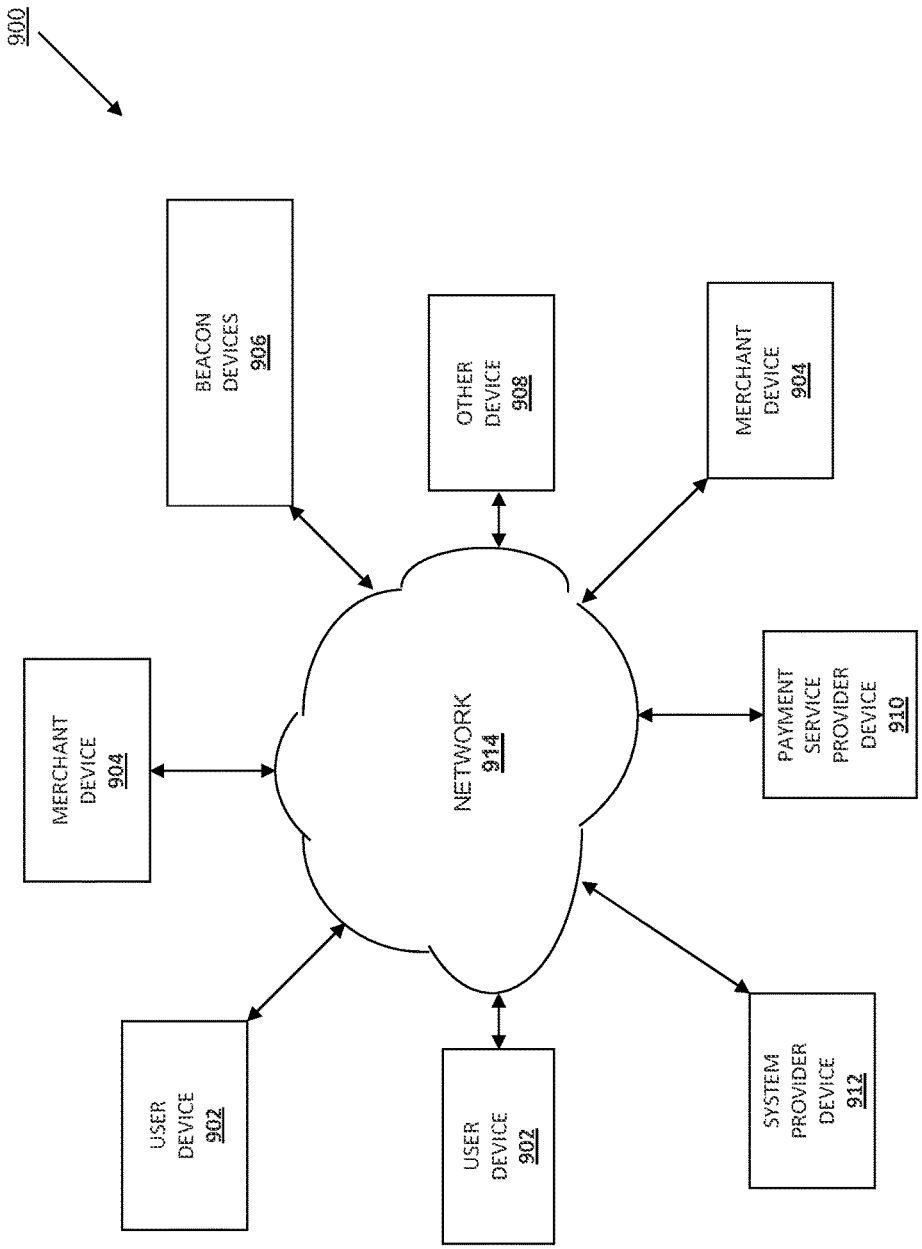
FIG. 9 is a schematic view illustrating an embodiment of a networked system.

Referring now to FIG. 9, an embodiment of a network-based system 900 for implementing one or more processes described herein is illustrated. As shown, the network-based system 900 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 9 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 900 illustrated in FIG. 9 includes a plurality of user devices 902, a plurality of merchant devices 904, a plurality of beacon devices 906, a plurality of other devices 908 (e.g., the users car or home discussed above), a payment service provider device 910, and/or a system provider device 912 in communication over one or more networks 914. The user devices 902 and/or other devices 908 may be the user devices and/or other devices discussed above and may be operated by the users discussed above. The merchant devices 904 and/or beacon devices 906 may be the merchant devices and/or beacon devices discussed above and may be operated by the merchants discussed above. The payment service provider device 910 may be the payment service provider devices discussed above and may be operated by a payment service provider such as, for example, PayPal Inc. of San Jose, Calif. The system provider devices 912 may be the system provider devices discussed above and may be operated by the system providers discussed above.

The user devices 902, merchant devices 904, beacon devices 906, other devices 908, payment service provider device 910, and/or system provider device 912 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 900, and/or accessible over the network 914.

The network 914 may be implemented as a single network or a combination of multiple networks. For example, in various embodiments, the network 914 may include the Internet and/or one or more intranets, landline networks, wireless networks, and/or other appropriate types of networks.

The user devices 902 may be implemented using any appropriate combination of hardware and/or software configured for wired and/or wireless communication over network 914. For example, in one embodiment, the user devices 902 may be implemented as a personal computer of a user in communication with the Internet. In other embodiments, the user devices 19902 may be a smart phone, personal digital assistant (PDA), laptop computer, and/or other types of computing devices.

The user devices 902 may include one or more browser applications which may be used, for example, to provide a convenient interface to permit the user to browse information available over the network 914. For example, in one embodiment, the browser application may be implemented as a web browser configured to view information available over the Internet.

The user devices 902 may also include one or more toolbar applications which may be used, for example, to provide user-side processing for performing desired tasks in response to operations selected by the user. In one embodiment, the toolbar application may display a user interface in connection with the browser application.

The user devices 902 may further include other applications as may be desired in particular embodiments to provide desired features to the user devices 192. In particular, the other applications may include a payment application for payments assisted by a payment service provider through the payment service provider device 910. The other applications may also include security applications for implementing customer-side security features, programmatic customer applications for interfacing with appropriate application programming interfaces (APIs) over the network 914, or other types of applications. Email and/or text applications may also be included, which allow user payer to send and receive emails and/or text messages through the network 914. The user devices 902 includes one or more user and/or device identifiers which may be implemented, for example, as operating system registry entries, cookies associated with the browser application, identifiers associated with hardware of the user devices 902, or other appropriate identifiers, such as a phone number. In one embodiment, the user identifier may be used by the payment service provider device 910 to associate the user with a particular account as further described herein.

The merchant devices 904 may be maintained, for example, by a conventional or on-line merchant, conventional or digital goods seller, individual seller, and/or application developer offering various products and/or services in exchange for payment to be received conventionally or over the network 914. In this regard, the merchant devices 904 may include a database identifying available products and/or services (e.g., collectively referred to as items) which may be made available for viewing and purchase by the user.

The merchant devices 904 also include a checkout application which may be configured to facilitate the purchase by the payer of items. The checkout application may be configured to accept payment information from the customer through the user devices 902 and/or from the payment service provider through the payment service provider device 910 over the network 914.

Figure 10:
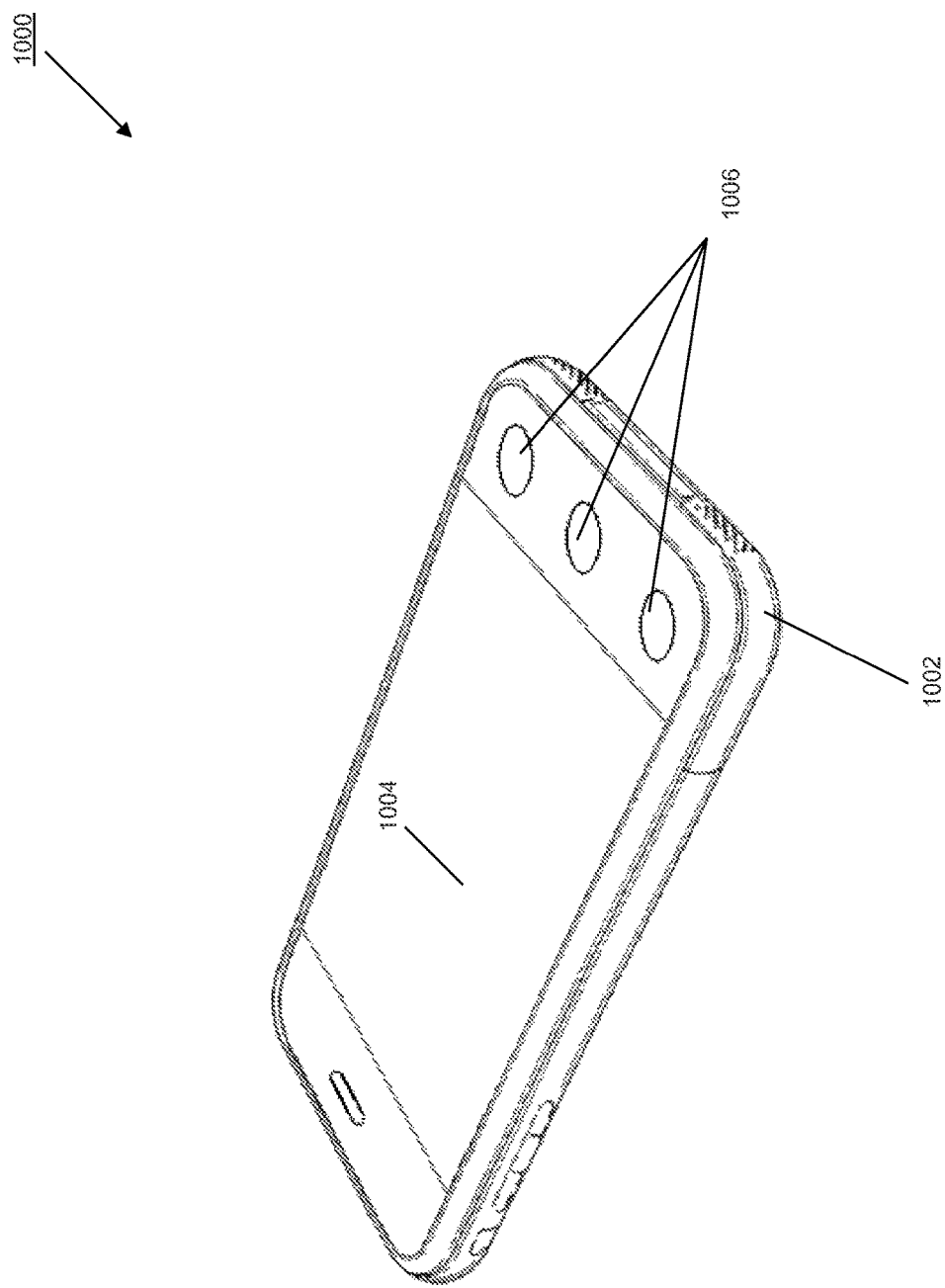
FIG. 10 is a perspective view illustrating an embodiment of a user device.

Referring now to FIG. 10, an embodiment of a user device 1000 is illustrated. The user device 1000 may be the user devices discussed above. The user device 1000 includes a chassis 1002 having a display 1004 and an input device including the display 1004 and a plurality of input buttons 1006. One of skill in the art will recognize that the user device 1000 is a portable or mobile phone including a touch screen input device and a plurality of input buttons that allow the functionality discussed above with reference to the methods above. However, a variety of other portable/mobile user devices and/or desktop user devices may be used in the methods discussed above without departing from the scope of the present disclosure.

Figure 11:
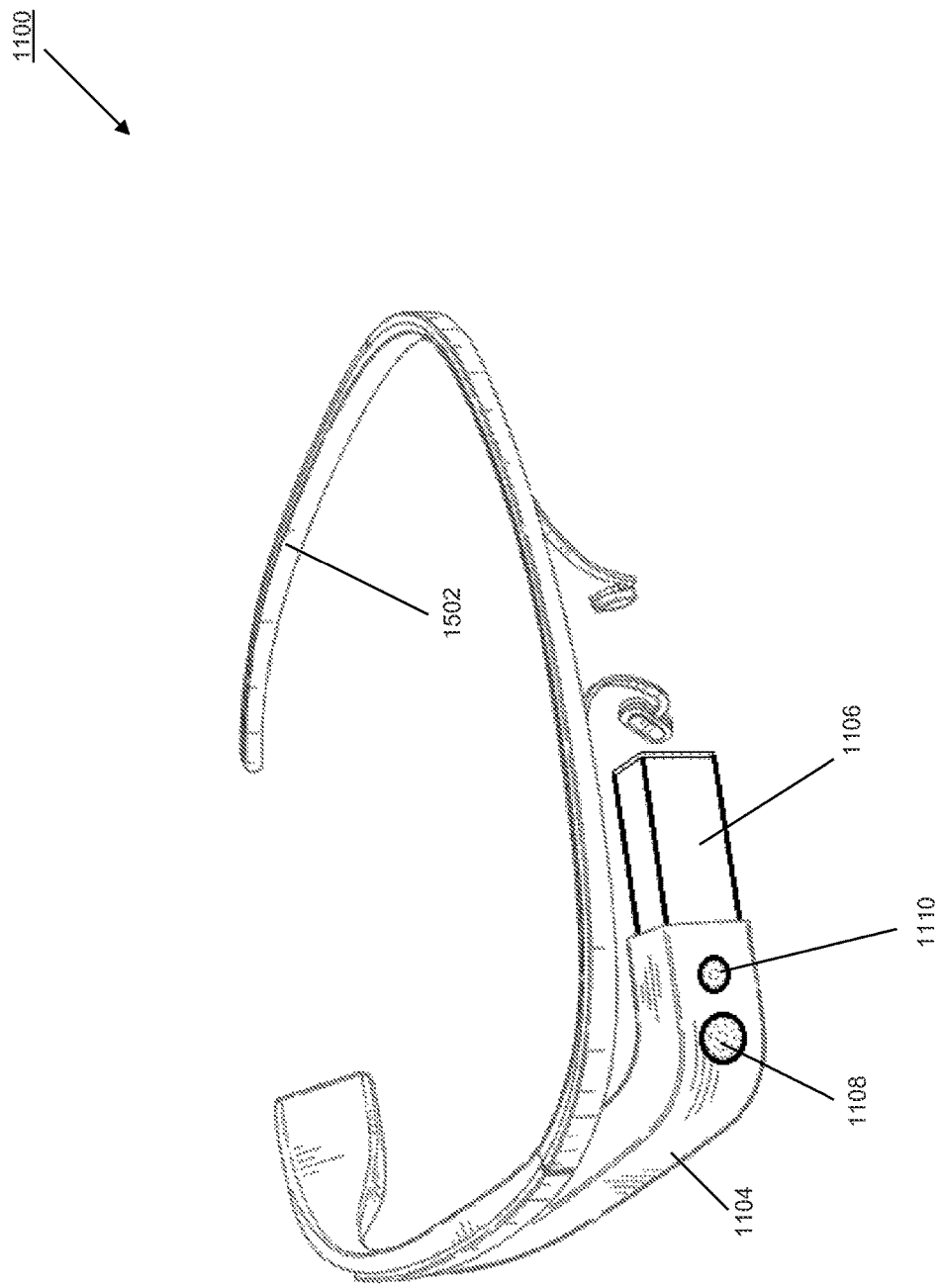
FIG. 11 is a perspective view illustrating an embodiment of a wearable device.
Figure 12:
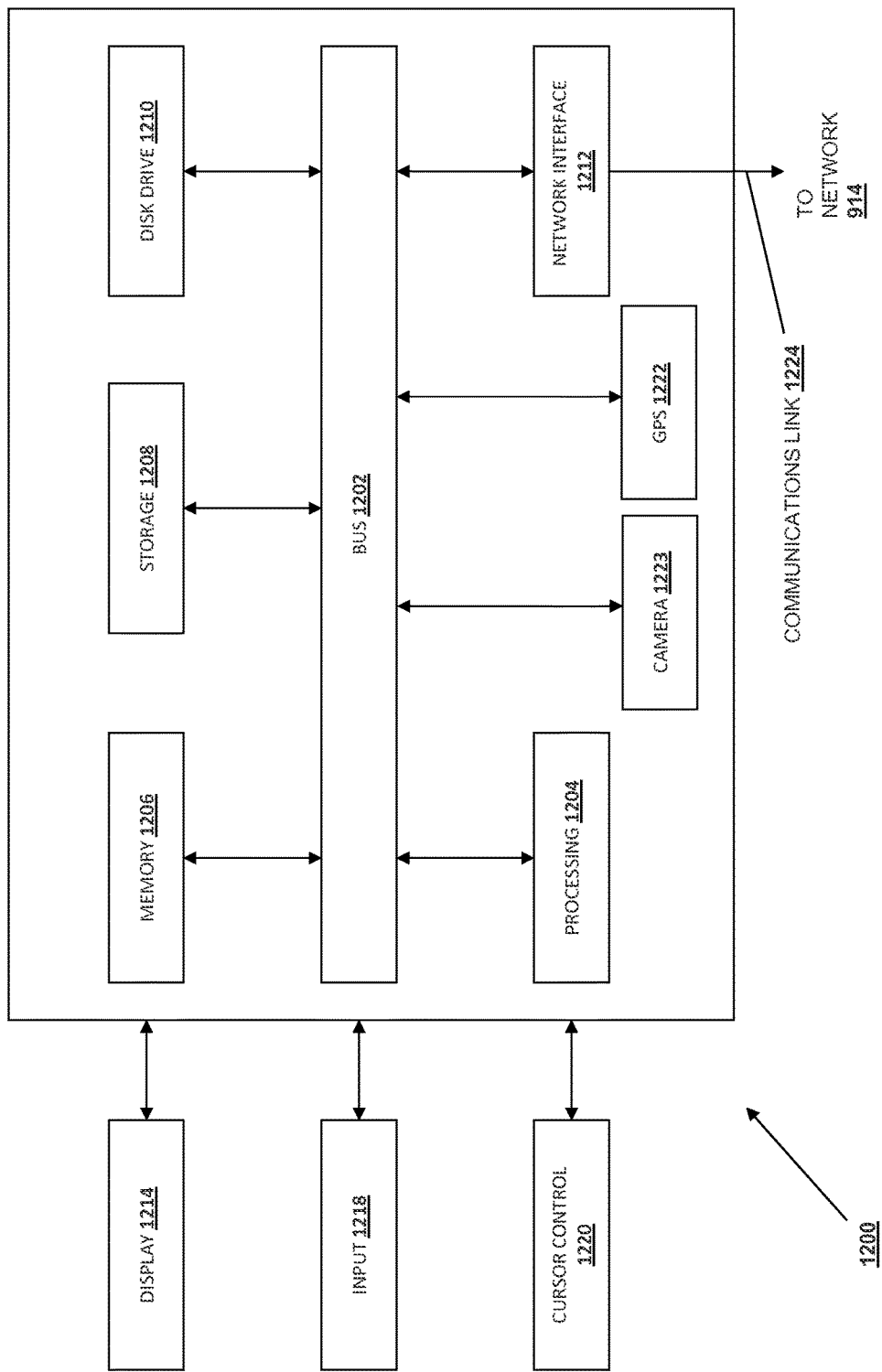
FIG. 12 is a schematic view illustrating an embodiment of a computer system.

Referring now to FIG. 11, an embodiment of a wearable device 1100 is illustrated. The wearable device 1100 may be the may be the wearable user devices, discussed above. The wearable device 1100 includes a frame 1102 having a computing chassis 1104 that extends from the frame 1102, a display device 1106 that extends from the computing chassis 1104, a microphone 1108 located on the computing chassis 1104, and a camera 1110 located on the computing chassis 1104. One of skill in the art will recognize that the wearable merchant device 1100 is a mobile wearable merchant device such as, for example, Google Glass® available from Google Inc. of Mountain View, Calif. that may provide a user with the functionality discussed above with reference to the methods discussed above. However, a variety of other mobile wearable devices (e.g., smart watches) may be used in the methods discussed above without departing from the scope of the present disclosure Referring now to FIG. 12, an embodiment of a computer system 1200 suitable for implementing, for example, the user devices, merchant devices, beacon devices, other devices, payment service provider device, and/or system provider device, is illustrated. It should be appreciated that other devices utilized by users, merchants, beacon devices, other devices, payment service providers, and/or system providers in the system discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), a location determination component 1222 (e.g., a Global Positioning System (GPS) device as illustrated, a cell tower triangulation device, and/or a variety of other location determination devices known in the art), and/or a camera component 1223. In one implementation, the disk drive component 1210 may comprise a database having one or more disk drive components.

In accordance with embodiments of the present disclosure, the computer system 1200 performs specific operations by the processor 1204 executing one or more sequences of instructions contained in the memory component 1206, such as described herein with respect to the user devices, merchant devices, beacon devices, other devices, payment service provider devices, and/or system provider devices. Such instructions may be read into the system memory component 1206 from another computer readable medium, such as the static storage component 1208 or the disk drive component 1210. In other embodiments, hard-wired circuitry may be used in place of or in combination with software instructions to implement the present disclosure.

Logic may be encoded in a computer readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 914 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Figure 13:
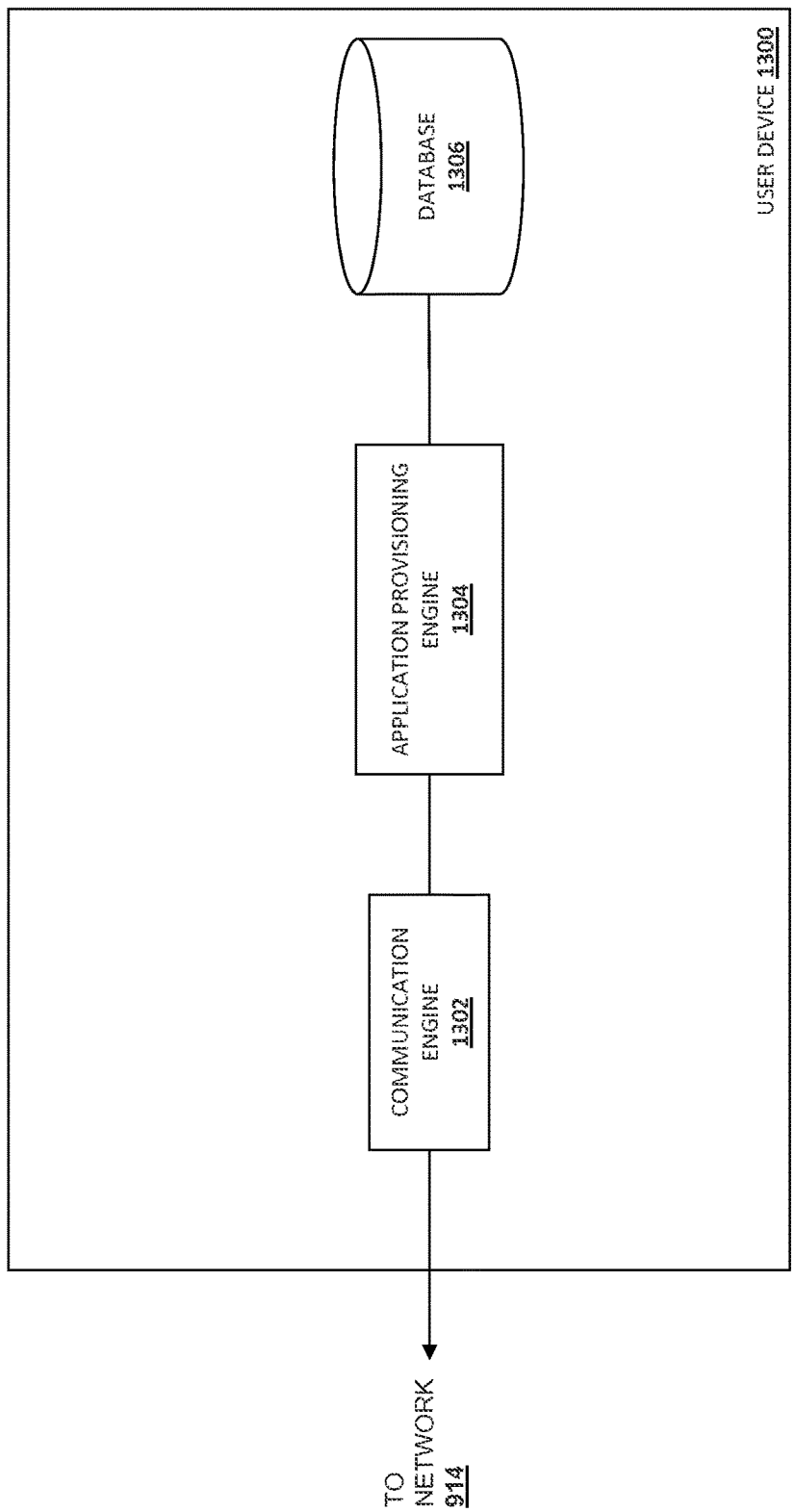
FIG. 13 is a schematic view illustrating an embodiment of a user device.

Referring now to FIG. 13, an embodiment of a user device or system provider device 1300 is illustrated. In an embodiment, the device 1300 may be the user devices and/or system provider devices discussed above. The device 1300 includes a communication engine 1302 that is coupled to the network 914 and to an application provisioning engine 1304 that is coupled to a database 1306. The communication engine 1302 may be software or instructions stored on a computer-readable medium that allows the device 1300 to send and receive information over the network 914. The application provisioning engine 1304 may be software or instructions stored on a computer-readable medium that is configured to associate application provisioning instructions with location information in the database 1306, detect a user device is in a location included in the location information, identify applications defined by the application provisioning instructions, and provide applications on the user device, as well as provide any of the other functionality that is discussed above. While the database 1306 has been illustrated as located in the device 1300, one of skill in the art will recognize that it may include multiple database and may be connected to the application provisioning engine 1304 through the network 914 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and users; however, a user or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An application provisioning system, comprising:
   a non-transitory memory storing instructions; and one or more hardware processors coupled to the memory and configured to read the instructions from the non-transitory memory to cause the system to perform operations comprising:
  detecting that a user device is located at a location;
  determining that an application compatible device that is located at the location is compatible with a first application that is executable on the user device;
  determining, in response to detecting that the user device is located at the location and determining that the application compatible device is compatible with the first application that is executable on the user device, that the first application and at least one second application that is executable on the user device are defined by one or more application provisioning instructions that are associated with the user device; and
  automatically providing, based on the first application and the at least one second application being defined by the one or more application provisioning instructions, each of the first application and the at least one second application for use on the user device.

2. The system of claim 1, wherein the operations further comprise:
  receiving location information and the one or more application provisioning instructions from a user through the user device; and
  storing the one or more application provisioning instructions in association with location information.

3. The system of claim 1, wherein the automatically providing each of the first application and the at least one second application for use on the user device further comprises:
  displaying the first application and the at least one second application or the user device; and
  switching between any two of the first application and the at least one second application in response to receiving a single input on the user device.

4. The system of claim 1, wherein the operations further comprise:
  determining that the user device is no longer located at the location; and
  automatically closing the first application and the at least one second application on the user device.

5. The system of claim 1, wherein the operations further comprise:
  detecting that a user device is located at the location during a predetermined time period that is defined by location information, wherein the first application and the at least one second application are determined to be defined by the application provisioning instructions based, at least in part, on the user device being located at the location during the predetermined time period.

6. The system of claim 1, wherein the automatically providing the first application and the at least one second application for use on the user device includes automatically providing a respective application icon for each of the first application and the at least one second application.

7. A method, comprising:
  accessing, by a user device in a database that is accessible by the user device, at least one application provisioning instruction in association with a plurality of user device applications that are executable on the user device;
  detecting, by the user device, that the user device is located at a location;
  determining, by the user device, that an application compatible device that is located at the location is compatible with a first user device application that is executable on the user device;
  determining, by the user device in response to determining that the user device is located at the location and the application compatible device is compatible with the first user device application that is executable on the user device, that the first user device application and at least one second user device application that is executable on the user device are defined by the at least one application provisioning instruction; and
  automatically providing, by the user device, based on the first user device application and the at least one second user device application being defined by the at least one application provisioning instructions, the first user device application and the at least one second user device application for use on the user device.

8. The method of claim 7, further comprising:
  automatically storing, by the user device in the database, the at least one application provisioning instruction in response to the use of the at least one second user device application at the location.

9. The method of claim 8, wherein the automatically providing each of the first user application and the at least one second user application for use on the user device further comprises:
  displaying, by the user device, the first user device application and the at least one second user device application on the user device; and
  switching between any two of the first user device application and the at least one second user device application in response to receiving a single input on the user device.

10. The method of claim 7, further comprising:
  determining, by the user device, that at least one of the first user device application and the at least one second user device application that were automatically provided for use on the user device have not been used for a predetermined amount of time; and
  automatically closing, by the user device, the at least one of the first user device application and the at least one user device second application on the user device.

11. The method of claim 7, wherein the automatically providing the first user device application for use on the user device includes automatically launching the first user device application on the user device.

12. The method of claim 7, wherein the automatically providing the first user device application and the at least one second user device application for use on the user device includes automatically providing a respective application icon for display on the user device for each of the first user device application and the at least one second user device application.

13. The method of claim 7, wherein the first user device application is payment application, and wherein the at least one second user device application includes an internet browser application directed to a particular website.

14. A non-transitory machine-readable medium comprising instructions which, in response to execution by a computer system, cause the computer system to perform a method comprising:
  accessing, in a database, one or more application provisioning instructions in association with a plurality of applications that are executable on a user device;
  detecting that the user device is located at a location;

identifying, in response to detecting that the user device is located at the location, at least one first application that is executable on the user device and that is associated with the one or more application provisioning instructions;

detecting an application compatible device that is located at the location;

determining that the application compatible device is compatible with a second application that is executable on the user device; and automatically providing, based on the at least one first application being associated with the one or more application provisioning instructions and the second application being compatible with the application compatible device, the at least one first application and the second application for use on the user device.

15. The non-transitory machine-readable medium of claim 14, wherein the method further comprises:
receiving association information for the one or more application provisioning instructions from a user through the user device and, in response, associating the one or more application provisioning instructions with the plurality of applications in the database.

16. The non-transitory machine-readable medium of claim 14, wherein the automatically providing the at least one first application and the second application for use on the user device includes automatically launching the at least one first application and the second application on the user device, and wherein the method further comprises:
automatically closing the at least one first application and the second application on the user device subsequent to automatically launching the at least one first application and the second application on the user device.

17. The non-transitory machine-readable medium of claim 14, wherein the automatically providing the at least one first application and the second application for use on the user device includes:
displaying the at least the device application and the second application on the user device; and
switching between any two of the at least one first application and the second user device application in response to receiving a single input on the user device.

18. The non-transitory machine-readable medium of claim 14, wherein the location comprises a first location and the method further comprises:
detecting that a user device is located at a second location that is different than the first location;
identifying, in response to detecting that the user device is located at the second location, a third application that is executable on the user device and that is associated with the on or more application provisioning instructions; and
automatically providing, based on the third application being associated with the one or more application provisioning instructions, the third application for use on the user device.

19. The non-transitory machine-readable medium of claim 14, wherein the automatically providing the at least one first application and the second application for use on the user device includes automatically providing a respective application icon for each at least one first application and the second application for display on a lock screen of the user device.

20. The non-transitory machine-readable medium of claim 14, wherein the at least one first application is an Internet Browser application, and wherein the second application is a payment application.

* * * * *